United States Patent
Raghavan et al.

(10) Patent No.: US 6,623,398 B2
(45) Date of Patent: Sep. 23, 2003

(54) MULTI-SPEED POWER TRANSMISSION WITH THREE PLANETARY GEAR SETS

(75) Inventors: Madhusudan Raghavan, West Bloomfield, MI (US); Chi-Kuan Kao, Troy, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 60 days.

(21) Appl. No.: 09/792,338

(22) Filed: Feb. 26, 2001

(65) Prior Publication Data

US 2002/0119859 A1 Aug. 29, 2002

(51) Int. Cl.$^7$ ................................................. F16H 3/66
(52) U.S. Cl. ........................................ 475/296; 475/325
(58) Field of Search ................................ 475/269, 296, 475/317, 319, 323, 325

(56) References Cited

U.S. PATENT DOCUMENTS

| | | | |
|---|---|---|---|
| 4,070,927 A | | 1/1978 | Polak ........................... 74/765 |
| 5,106,352 A | | 4/1992 | Lepelletier ................... 475/280 |
| 5,226,862 A | * | 7/1993 | Hattori ......................... 475/286 |
| 5,315,898 A | * | 5/1994 | Koyama et al. ............. 475/330 |
| 5,599,251 A | * | 2/1997 | Beim et al. .................. 475/275 |
| 5,707,312 A | * | 1/1998 | Sefcik .......................... 475/275 |
| 5,755,636 A | * | 5/1998 | Justice et al. ................ 475/275 |
| 5,772,552 A | * | 6/1998 | Ibaraki et al. ............... 475/281 |
| 6,071,208 A | | 6/2000 | Koivunen .................... 475/275 |

FOREIGN PATENT DOCUMENTS

EP 1033510 A1 * 6/2000

* cited by examiner

Primary Examiner—Ankur Parekh
(74) Attorney, Agent, or Firm—Kathryn A. Marra

(57) ABSTRACT

A family of transmissions has three planetary gear sets controlled by five torque transmitting mechanisms that are selectively operable to provide six forward speed ratios and a reverse ratio between an input shaft and an output shaft. The planetary gear sets may be of the single or double pinion gear type and each include three members such as a sun gear member, a ring gear member and a planet carrier assembly member. First and second members of the first planetary gear set are continuously connected with respective first and second members of the second planetary gear set. A first member of the third planetary gear set is continuously connected to a stationary component. The input shaft is continuously connected to at least one member of one of the planetary gear sets and the output shaft is connected to at least one member of one of the planetary gear sets. The five torque transmitting mechanisms are engaged in pairs to provide selective interconnections between members of the planetary gear sets, the input shaft, the output shaft, and the stationary component.

8 Claims, 10 Drawing Sheets

| | RATIOS | 50 | 52 | 54 | 56 | 58 |
|---|---|---|---|---|---|---|
| REVERSE | -2.99 | | X | | | X |
| NEUTRAL | 0 | | | | | |
| 1st | 3.63 | | | | X | X |
| 2nd | 2.05 | X | | X | | |
| 3rd | 1.31 | | | X | | X |
| 4th | 1 | | | | X | X |
| 5th | 0.67 | | X | | X | |
| 6th | 0.6 | X | X | | | |

(X=ENGAGED CLUTCH)

RING/SUN TOOTH RATIOS: $\frac{R1}{S1} = 1.50$, $\frac{R2}{S2} = 2.37$, $\frac{R3}{S3} = 2.63$

| Ratio Spread | 6.05 |
|---|---|
| Ratio Steps | |
| Rev/ 1 | -0.82 |
| 1/2 | 1.77 |
| 2/3 | 1.56 |
| 3/4 | 1.31 |
| 4/5 | 1.48 |
| 5/6 | 1.12 |

| | RATIOS | 150 | 152 | 154 | 156 | 158 |
|---|---|---|---|---|---|---|
| REVERSE | -1.77 | | X | | | X |
| NEUTRAL | 0 | | | | | X |
| 1st | 2.63 | X | | | | X |
| 2nd | 1.88 | | | X | | X |
| 3rd | 1 | | X | X | | |
| 4th | 0.7 | | X | | X | |
| 5th | 0.58 | X | | | X | |
| 6th | 0.46 | | | X | X | |

(X=ENGAGED CLUTCH)

RING/SUN TOOTH RATIOS: $\frac{R1}{S1}=1.86$, $\frac{R2}{S2}=1.70$, $\frac{R3}{S3}=1.63$

| Ratio Spread | 5.71 |
|---|---|
| Ratio Steps | |
| Rev/ 1 | -0.67 |
| 1/2 | 1.4 |
| 2/3 | 1.88 |
| 3/4 | 1.42 |
| 4/5 | 1.21 |
| 5/6 | 1.26 |

| | RATIOS | 250 | 252 | 254 | 256 | 258 |
|---|---|---|---|---|---|---|
| REVERSE | -1.9 | X | | | | X |
| NEUTRAL | 0 | | | | | |
| 1st | 3.64 | | | X | X | |
| 2nd | 2.05 | | X | X | | |
| 3rd | 1.32 | | | X | | X |
| 4th | 1 | X | | X | | |
| 5th | 0.68 | X | | | X | |
| 6th | 0.6 | X | X | | | |

(X=ENGAGED CLUTCH)

RING/SUN TOOTH RATIOS: $\frac{R1}{S1}=2.64$, $\frac{R2}{S2}=2.30$, $\frac{R3}{S3}=1.51$

| Ratio Spread | 6.05 |
|---|---|
| Ratio Steps | |
| Rev/ 1 | -0.52 |
| 1/2 | 1.77 |
| 2/3 | 1.55 |
| 3/4 | 1.32 |
| 4/5 | 1.48 |
| 5/6 | 1.12 |

| | RATIOS | 350 | 352 | 354 | 356 | 358 |
|---|---|---|---|---|---|---|
| REVERSE | -2.99 | | X | | | X |
| NEUTRAL | 0 | | | | | |
| 1st | 3.63 | | | X | X | |
| 2nd | 2.05 | X | | X | | |
| 3rd | 1.31 | | | X | | X |
| 4th | 1 | | | | X | X |
| 5th | 0.67 | | X | | X | |
| 6th | 0.6 | X | X | | | |

(X=ENGAGED CLUTCH)

RING/SUN TOOTH RATIOS: $\frac{R1}{S1} = 2.50$, $\frac{R2}{S2} = 2.37$, $\frac{R3}{S3} = 2.63$

| Ratio Spread | 6.05 |
|---|---|
| Ratio Steps | |
| Rev/ 1 | -0.82 |
| 1/2 | 1.77 |
| 2/3 | 1.56 |
| 3/4 | 1.31 |
| 4/5 | 1.48 |
| 5/6 | 1.12 |

| RATIOS | | 450 | 452 | 454 | 456 | 458 |
|---|---|---|---|---|---|---|
| REVERSE | -2.4 | | X | | X | |
| NEUTRAL | 0 | | | | | |
| 1st | 3.63 | | | X | | X |
| 2nd | 2.01 | X | | X | | |
| 3rd | 1.3 | | | X | X | |
| 4th | 1 | | | | X | X |
| 5th | 0.69 | | X | | | X |
| 6th | 0.61 | X | X | | | |

(X = ENGAGED CLUTCH)

RING/SUN TOOTH RATIOS: $\frac{R1}{S1}=2.33$, $\frac{R2}{S2}=2.60$, $\frac{R3}{S3}=2.63$

| Ratio Spread | 5.9 |
|---|---|
| Ratio Steps | |
| Rev/ 1 | -0.66 |
| 1/2 | 1.8 |
| 2/3 | 1.54 |
| 3/4 | 1.3 |
| 4/5 | 1.45 |
| 5/6 | 1.12 |

| | RATIOS | 558 | 550 | 552 | 554 | 556 |
|---|---|---|---|---|---|---|
| REVERSE | -2.83 | X | X | | | |
| NEUTRAL | 0 | X | | | | |
| 1st | 4.67 | X | | | | X |
| 2nd | 3.09 | | | X | | X |
| 3rd | 1.98 | | X | | | X |
| 4th | 1.49 | | | | X | X |
| 5th | 1 | | X | | X | |
| 6th | 0.74 | | | | X | X |

(X=ENGAGED CLUTCH)

RING/SUN TOOTH RATIOS: $\frac{R1}{S1}=1.53$, $\frac{R2}{S2}=2.83$, $\frac{R3}{S3}=2.53$

| Ratio Spread | 6.33 |
|---|---|
| Ratio Steps | |
| Rev/ 1 | -0.6 |
| 1/2 | 1.51 |
| 2/3 | 1.56 |
| 3/4 | 1.33 |
| 4/5 | 1.49 |
| 5/6 | 1.35 |

| | RATIOS | 658 | 650 | 652 | 654 | 656 |
|---|---|---|---|---|---|---|
| REVERSE | -2.33 | X | X | | | |
| NEUTRAL | 0 | X | | | | |
| 1st | 3.71 | X | | | | X |
| 2nd | 2.39 | | | X | | X |
| 3rd | 1.58 | | X | | | X |
| 4th | 1.17 | | | | X | X |
| 5th | 0.82 | | X | | X | |
| 6th | 0.6 | | | X | X | |

(X=ENGAGED CLUTCH)

RING/SUN TOOTH RATIOS: $\frac{R1}{S1}=1.59$, $\frac{R2}{S2}=1.53$, $\frac{R3}{S3}=1.53$

| Ratio Spread | 6.13 |
|---|---|
| Ratio Steps | |
| Rev/ 1 | -0.63 |
| 1/2 | 1.55 |
| 2/3 | 1.56 |
| 3/4 | 1.31 |
| 4/5 | 1.43 |
| 5/6 | 1.35 |

| | RATIOS | 758 | 750 | 752 | 754 | 756 |
|---|---|---|---|---|---|---|
| REVERSE | -3.46 | X | X | | | |
| NEUTRAL | 0 | X | | | | |
| 1st | 3.78 | X | | | | X |
| 2nd | 2.06 | | | X | | X |
| 3rd | 1.38 | X | | | | X |
| 4th | 1 | | | | X | X |
| 5th | 0.75 | | X | | X | |
| 6th | 0.62 | | | X | X | |

(X=ENGAGED CLUTCH)

RING/SUN TOOTH RATIOS: $\frac{R1}{S1}=2.33$, $\frac{R2}{S2}=1.63$, $\frac{R3}{S3}=2.13$

| Ratio Spread | 6.11 |
|---|---|
| Ratio Steps | |
| Rev/ 1 | -0.92 |
| 1/2 | 1.84 |
| 2/3 | 1.5 |
| 3/4 | 1.38 |
| 4/5 | 1.33 |
| 5/6 | 1.22 |

| | RATIOS | 858 | 850 | 852 | 854 | 856 |
|---|---|---|---|---|---|---|
| REVERSE | -1.12 | X | X | | | |
| NEUTRAL | 0 | X | | | | |
| 1st | 1.85 | X | | | | X |
| 2nd | 1.22 | | | | X | X |
| 3rd | 0.78 | | X | | | X |
| 4th | 0.59 | | | | X | X |
| 5th | 0.4 | | X | | X | |
| 6th | 0.29 | | | X | X | |

(X=ENGAGED CLUTCH)

RING/SUN TOOTH RATIOS: $\frac{R1}{S1}=1.53$, $\frac{R2}{S2}=2.83$, $\frac{R3}{S3}=2.53$

| Ratio Spread | 6.33 |
|---|---|
| Ratio Steps | |
| Rev/ 1 | -0.6 |
| 1/2 | 1.51 |
| 2/3 | 1.56 |
| 3/4 | 1.33 |
| 4/5 | 1.49 |
| 5/6 | 1.35 |

|  | RATIOS | 958 | 950 | 952 | 954 | 956 |
|---|---|---|---|---|---|---|
| REVERSE | -1.53 | X | X |  |  |  |
| NEUTRAL | 0 | X |  |  |  |  |
| 1st | 2.42 | X |  |  |  | X |
| 2nd | 1.56 |  |  | X |  | X |
| 3rd | 1 |  | X |  |  | X |
| 4th | 0.76 |  |  |  | X | X |
| 5th | 0.53 |  | X |  | X |  |
| 6th | 0.4 |  |  | X | X |  |

(X = ENGAGED CLUTCH)

RING/SUN TOOTH RATIOS: $\frac{R1}{S1}=1.59$, $\frac{R2}{S2}=1.53$, $\frac{R3}{S3}=1.53$

| Ratio Spread | 6.13 |
|---|---|
| Ratio Steps |  |
| Rev/ 1 | -0.63 |
| 1/2 | 1.55 |
| 2/3 | 1.56 |
| 3/4 | 1.31 |
| 4/5 | 1.43 |
| 5/6 | 1.35 |

MULTI-SPEED POWER TRANSMISSION WITH THREE PLANETARY GEAR SETS

TECHNICAL FIELD

This invention relates to multi-speed transmissions and more particularly to a family of transmissions employing three planetary gear sets and five torque transmitting mechanisms to provide at least six forward speed ratios and a reverse ratio.

BACKGROUND OF THE INVENTION

Passenger vehicles include a powertrain that is comprised of an engine, multi-speed transmission and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration. It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978, U.S. Pat. No. 6,071,208 issued to Koivunen on Jun. 6, 2000, U.S. Pat. No. 5,106,352 issued to Lepelletier on Apr. 21, 1992, and U.S. Pat. No. 5,599,251 issued to Beim and McCarrick on Feb. 4, 1997.

Six speed transmissions offer several advantages over four and five speed transmissions, including improved vehicle acceleration and improved fuel economy. While many trucks employ power transmissions, such as Polak, having six or more forward gear ratios, passenger cars are still manufactured with three and four speed automatic transmissions and relatively few five or six speed devices due to the size and complexity of these transmissions. The Polak transmission provides six forward speed ratios with three planetary gear sets, two clutches and three brakes. The Koivunen and Beim patents utilize six torque transmitting devices including four brakes and two clutches to establish the six forward speed ratios and another reverse ratio. The Lepelletier employs three planetary gear sets, three clutches and two brakes to provide six forward speeds. One of the planetary gear sets is positioned and operated to establish two fixed speed input members for the remaining two planetary gear sets.

SUMMARY OF THE INVENTION

It is an object of the present invention to provide an improved family of multi-speed transmission having three planetary gear sets and five torque transmitting mechanisms.

In one aspect of the present invention, the three planetary gear sets each have three members that are a sun gear member, a ring gear member and a planet carrier assembly member. In another aspect of the present invention, an input shaft is continuously connected with one member of one of the planetary gear sets. In yet another aspect of the present invention, the planetary gear set to which the input shaft is continuously connected may be of either the simple or compound type. In still another aspect of the present invention, a first member of each of a first and second of the planetary gear sets are continuously interconnected, a second member of the planetary gear sets are also continuously interconnected, and a first member of the third planetary gear set is continuously connected with a stationary portion of the transmission.

In yet still another aspect of the present invention, an output shaft is continuously connected with a member of one of the planetary gear sets. In a further aspect of the present invention, the five torque transmitting mechanisms are either five selectively engageable rotating torque transmitting mechanisms (clutches) or four rotating torque transmitting mechanisms and one selectively engageable stationary torque transmitting mechanism (brake). In a yet further aspect of the present invention, a first and second of the rotating torque transmitting mechanisms selectively connect the second member of the third planetary gear set with members of the first or second planetary gear sets, a third of the rotating torque transmitting mechanisms selectively connects the third member of the third planetary gear set with members of the first or second planetary gear sets, and a fourth of rotating torque transmitting mechanisms selectively connects the first or third member of the third planetary gear set with a member of the first or second planetary gear sets. In a still further aspect of the present invention, the fifth torque transmitting mechanism selectively connects a member of the first or second planetary gear set with either a member of the third planetary gear set or with a stationary portion of the transmission.

The present invention presents a family of multi-speed transmissions having three planetary gear sets and five selectively engageable torque transmitting mechanisms comprised of either five clutches or four clutches and one brake. Each of the planetary gear sets has first, second, and third members including a sun gear member, a ring gear member, and a planet carrier assembly member. The planet carrier assembly member can be of the single pinion (simple) type or the double pinion (compound) type.

A first and second members of the first planetary gear set are continuously interconnected with respective first and second members of the second planetary gear set. A first member of the third planetary gear set is continuously connected to ground (transmission case). The input and output shafts are continuously connected with the continuously interconnected members or with other members of the planetary gear sets.

A first and second of the torque transmitting mechanisms selectively interconnect the second member of the third planetary gear set with members of the first or second planetary gear set. A third of the torque transmitting mechanisms selectively interconnects the third member of the third planetary gear set with members of the first or second planetary gear set. A fourth of the torque transmitting mechanisms selectively interconnects the first or third member of the third planetary gear set with a member of the first or second planetary gear set. A fifth of the torque transmitting mechanisms either selectively interconnects a member of the first or second planetary gear set with a member of the third planetary gear set, or selectively connects a member of the first or second planetary gear set to the transmission case. The five torque transmitting mechanisms are selectively engaged in combinations of two to establish six forward speed ratios and one reverse speed ratio between the input and output shafts of the transmissions.

DESCRIPTION OF EXEMPLARY EMBODIMENTS

Figures 1, 2:
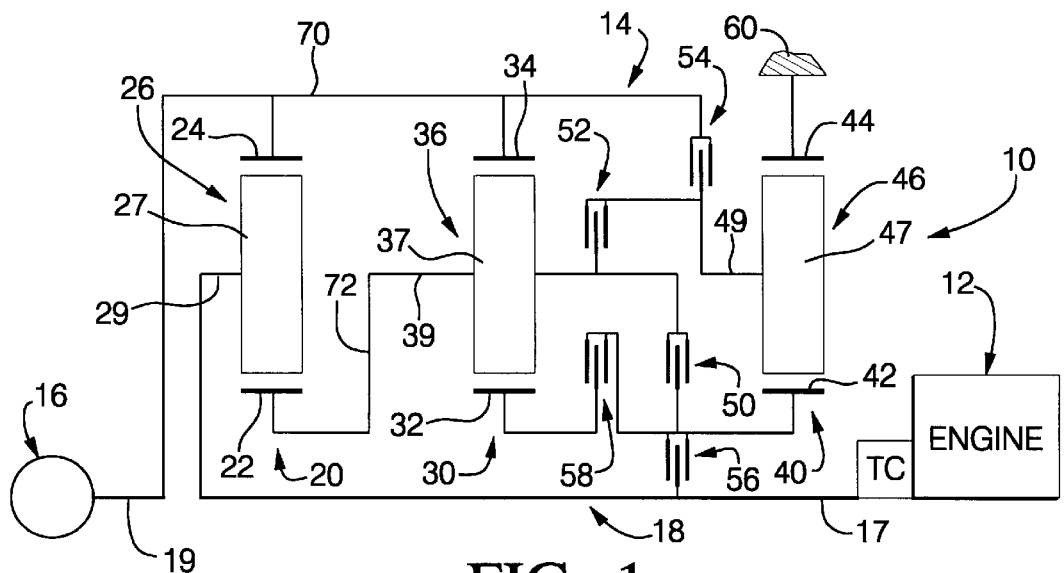
FIG. 1 is schematic representation of a powertrain incorporating one embodiment of the present invention.
FIG. 2 is a truth table and chart describing some of the operating characteristics of the powertrain depicted in FIG. 1.

A powertrain 10, shown in FIG. 1, depicts a conventional engine and torque converter 12, a planetary transmission 14, and a conventional final drive mechanism 16. The planetary transmission 14 has an input shaft 17, a planetary gear arrangement 18, and an output shaft 19. The planetary gear arrangement 18 includes three planetary gear sets 20, 30 and 40. The planetary gear set 20 includes a sun gear member 22, a ring gear member 24 and a planet carrier assembly member 26 which has a plurality of pinion gears 27 rotatably mounted on a carrier 29 and disposed in mesh with the sun gear member 22 and the ring gear member 24. The planetary gear set 20 is a simple planetary gear set, that is a plurality of single pinion gears mesh between the sun gear member 22 and the ring gear member 24. The planetary gear set 30 includes a sun gear member 32, a ring gear member 34 and a planet carrier assembly member 36 which incorporates a plurality of pinion gears 37 rotatably mounted on a carrier 39 and disposed in meshing relation with the sun gear member 32 and the ring gear member 34. The planetary gear set 30 is a simple planetary gear set. The planetary gear set 40 includes a sun gear member 42, a ring gear member 44, and a planet carrier assembly member 46 which has a plurality of pinion gears 47 rotatably mounted on a carrier 49 and disposed in meshing relation with the sun gear member 42 and the ring gear member 44.

The planetary gear arrangement 18 also includes five rotating type torque transmitting mechanisms 50, 52, 54, 56, and 58. The torque transmitting mechanisms are conventional selectively engaged fluid operated devices commonly termed clutches. The torque transmitting mechanisms are preferably controlled by a conventional electro-hydraulic control system, not shown, that includes a preprogrammed digital computer.

The input shaft 17 is continuously connected between the engine and torque converter 12 and the planet carrier assembly member 26. The output shaft 19 is continuously connected between the final drive 16 and a first interconnecting member 70 which continuously interconnects the ring gear member 24 and the ring gear member 34. The ring gear member 44 is continuously connected with a stationary portion or housing 60 of the transmission 14. A second interconnecting member 72 continuously interconnects the sun gear member 22 and the planet carrier assembly member 36. The torque transmitting mechanism 50 selectively interconnects the sun gear member 42 and the second interconnecting member 72. The torque transmitting mechanism 52 selectively interconnects the planet carrier assembly member 46 and the second interconnecting member 72. The torque transmitting mechanism 54 selectively interconnects the planet carrier assembly member 46 and the first interconnecting member 70. The torque transmitting mechanism 56 selectively interconnects the input shaft 17 and the sun gear member 42, and the torque transmitting mechanism 58 selectively interconnects the sun gear member 42 and the sun gear member 32.

As described in FIG. 2, the torque transmitting mechanisms 50, 52, 54, 56, and 58 are selectively engaged in combinations of two to establish a reverse drive ratio and six forward drive ratios in the planetary gear arrangement 18 between the input shaft 17 and the output shaft 19. A neutral condition is also provided. The reverse drive ratio is established with the engagement of the torque transmitting mechanisms 52 and 58. This interconnects the planet carrier assembly member 46 and the second interconnecting member 72, and interconnects the sun gear members 42 and 32. Forward (engine direction) rotation of the input shaft 17 causes forward rotation of the sun gear member 22, the planet carrier assembly member 36 and the planet carrier assembly member 46 at a speed determined by the tooth ratio of the planetary gear set 20. The sun gear members 42 and 32 are driven forwardly at a speed determined by the tooth ratio of the planetary gear set 40 and the speed of the planet carrier assembly member 46. The ring gear member 34 and the output shaft 19 are driven in reverse (opposite engine direction) at a speed determined by the speed of the sun gear member 32 and the tooth ratio of the planetary gear set 30. The overall numerical value of the reverse ratio is determined by the tooth ratios of the planetary gear sets 20, 30 and 40.

The first forward ratio is established by the engagement of the torque transmitting mechanisms 54 and 56. This action selectively connects the input shaft 17 with the sun gear member 42 and the output shaft 19 with the planet carrier assembly member 46, respectively. Since the ring gear member 44 is stationary, the planet carrier assembly member 46 and the output shaft 19 are driven forwardly at a reduced speed (underdrive) determined by the speed of the sun gear member 42 and the tooth ratio of the planetary gear set 40. The overall numerical value of the first forward speed ratio is determined by the tooth ratio of the planetary gear set 40.

The second forward speed ratio is established by the interchange of the torque transmitting mechanisms 50 and 56 while the torque transmitting mechanism 54 remains engaged. This is a single transition shift. The torque transmitting mechanism 50 interconnects the second interconnecting member 72 with the sun gear member 42. The sun gear member 42 is driven forwardly at a speed determined by the speed of the planet carrier assembly member 26 and the tooth ratio of the planetary gear set 20. The planet carrier assembly member 46 and the output shaft 19 are driven forwardly at a reduced speed determined by the speed of the sun gear member 42 and the tooth ratio of the planetary gear set 40. The overall numerical value of the second forward ratio is determined by the tooth ratios of the planetary gear sets 20 and 40.

The third forward speed ratio is established by the interchange of the torque transmitting mechanisms 58 and 50. This is a single transition shift. The torque transmitting mechanism 58 interconnects the sun gear members 32 and 42. The forward rotation of the input shaft 17 and the planet carrier assembly member 26 causes forward rotation of the sun gear member 22 and the planet carrier assembly member 36 at a speed determined by the speed of the input shaft 17 and the tooth ratio of the planetary gear set 20. The sun gear members 32 and 42 are driven forwardly at a speed determined by the speed of the planet carrier assembly member 36 and the tooth ratio of the planetary gear set 30. The planet carrier assembly member 46 and the output shaft 19 are driven forwardly at a reduced speed determined by the speed of the sun gear member 42 and the tooth ratio of the planetary gear set 40. The overall numerical value of the third forward speed ratio is determined by the tooth ratios of the planetary gear sets 20, 30, and 40.

The fourth forward speed ratio is established by the interchange of the torque transmitting mechanisms 56 and 54. This is a single transition shift. The engagement of the torque transmitting mechanism 56 interconnects the input shaft 17 with the sun gear member 32. This action establishes a connection between each of the members of the planetary gear sets 20 and 30 which results in a one to one ratio (direct drive).

The fifth forward speed ratio is established by the interchange of the torque transmitting mechanisms 58 and 52. This is a single transition shift. The torque transmitting mechanism 52 interconnects the second interconnecting member and the planet carrier assembly member 46. The planet carrier assembly member 26 and the sun gear member 42 are driven forwardly at the speed of the input shaft 17. The planet carrier assembly members 46 and 36 and the sun gear member 22 are driven forwardly at a reduced speed determined by the speed of the sun gear member 42 and the tooth ratio of the planetary gear set 40. The ring gear member 24 is driven forwardly at an increased ratio (overdrive) at a speed determined by the speeds of the planet carrier assembly member 26 and the sun gear member 22 and the tooth ratio of the planetary gear set 20. The overall numerical value of the fifth forward speed ratio is determined by the tooth ratios of the planetary gear sets 20 and 40.

The sixth forward speed ratio is established by the interchange of the torque transmitting mechanisms 56 and 50. This is a single transition shift. The torque transmitting mechanism 50 interconnects the sun gear member 42 and the second interconnecting member 72. The simultaneous engagement of the torque transmitting mechanisms 50 and 52 effectively connects the planetary gear set 40 and the sun gear member 22 with the stationary member 60. The input shaft 17 rotates the planet carrier assembly member 26 forwardly which results in forward rotation of the ring gear member 24 and the output shaft 19 at an increased speed. The overall numerical value of the sixth forward speed ratio is determined by the tooth ratio of the planetary gear set 20.

The truth table in FIG. 2 describes the interchange sequence of the torque transmitting mechanisms 50, 52, 54, 56, and 58 for the forward ratios and the reverse ratio. The numerical values given are computed from the tooth ratios of the planetary gear sets 20, 30, and 40 as given in FIG. 2. The tooth ratio R1/S1 is for the ratio of the ring gear member 24 to the sun gear member 22 of the planetary gear set 20, the tooth ratio R2/S2 is for ratio of the ring gear member 34 to the sun gear member 32 of the planetary gear set 30, and the tooth ratio R3/S3 is for the ratio of the ring gear member 44 to the sun gear member 42 of the planetary gear set 40. The value of the ratio steps is also given in FIG. 2. For example, the numerical step between the first ratio and the second ratio is 1.77 when the given tooth ratios are employed.

Figures 3, 4:
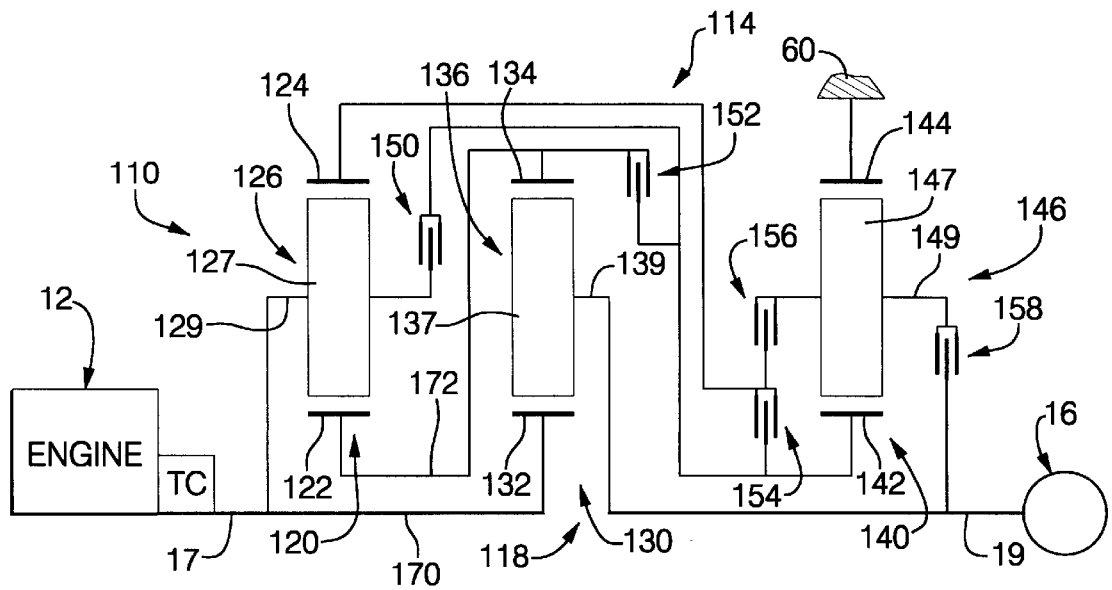
FIG. 3 is schematic representation of a powertrain incorporating another embodiment of the present invention.
FIG. 4 is a truth table and chart describing some of the operating characteristics of the powertrain depicted in FIG. 3.

A powertrain 110, shown in FIG. 3, includes a conventional engine and torque converter 12, a multi-speed planetary transmission 114, and a conventional final drive mechanism 16. The planetary transmission 114 has an input shaft 17, a planetary gear arrangement 118, and an output shaft 19. The input shaft 17 is continuously connected with the engine and torque converter 12 and the output shaft 19 is continuously connected with the final drive mechanism 16. The planetary gear arrangement 118 includes three planetary gear sets 120, 130, and 140 and five torque transmitting mechanisms 150, 152, 154, 156, and 158. The planetary gear set 120 has a sun gear member 122, a ring gear member 124, and a planet carrier assembly member 126 which includes a plurality of pinion gears 127 rotatably mounted on a carrier 129 and disposed in meshing relation with the sun gear member 122 and the ring gear member 124. The planetary gear set 130 has a sun gear member 132, a ring gear member 134, and a planet carrier assembly member 136 that incorporates a plurality of pinion gears 137 rotatably mounted on a carrier 139 and disposed in meshing relation with the sun gear member 132 and the ring gear member 134. The planetary gear set 140 includes a sun gear member 142, a ring gear member 144 and a planet carrier assembly member 146 which includes a plurality of pinion gears 147 rotatably mounted on a carrier 149 and disposed in meshing relation with the sun gear member 142 and the ring gear member 144. Each of the planetary gear sets 120, 130, and 140 are of the simple planetary type wherein the sun gear member and the ring gear member rotate in opposite directions when the carrier is held stationary and one of the gears is rotated.

The input shaft 17 is continuously connected with a first interconnecting member 170 that continuously interconnects the planet carrier assembly member 126 and the sun gear member 132. The output shaft 19 is continuously connected with the planet carrier assembly member 136. The ring gear member 144 is continuously connected with the stationary portion 60. A second interconnecting member 172 continuously interconnects the sun gear member 122 and the ring gear member 134. The first torque transmitting mechanism 150 selectively interconnects the first interconnecting member 170 and the sun gear member 142. The second torque transmitting mechanism 152 selectively interconnects the second interconnection 172 and the sun gear member 142. The third torque transmitting mechanism 154 selectively interconnects the ring gear member 124 and the sun gear member 142. The fourth torque transmitting mechanism 156 selectively interconnects the ring gear member 124 and the planet carrier assembly member 146, and the fifth torque transmitting mechanism 158 selectively interconnects the output shaft 19 and the planet carrier assembly member 146.

As seen in FIG. 4, the torque transmitting mechanisms 150, 152, 154, 156, and 158 are engaged in combinations of two to provide six forward drive ratios and a reverse drive ratio. A neutral condition is also provided. The reverse drive ratio is established with the engagement of the torque transmitting mechanisms 152 and 158. During the reverse drive ratio, the sun gear member 132 is rotated forwardly by the input shaft 17 and the ring gear member 134 and the sun gear member 142 are rotated in reverse at a speed determined by the speed of the sun gear member 132 and the tooth ratio of the planetary gear set 130. The planet carrier assembly member 146 and the output shaft 19 are driven in reverse at a speed determined by the speed of the sun gear member 142 and the tooth ratio of the planetary gear set 140. The overall numerical ratio of the reverse drive ratio is determined by the tooth ratios of the planetary gear sets 130 and 140.

The first forward speed ratio is established by the engagement of the torque transmitting mechanisms 150 and 158. It should be noted that the torque transmitting mechanism 158 can remain engaged through the neutral condition. The torque transmitting mechanism 150 interconnects the input shaft 17 with the sun gear member 142 and the torque transmitting mechanism 158, as pointed out above, connects the planet carrier assembly member 146 with the output shaft 19. Forward rotation of the sun gear member 142 will cause forward rotation of the planet carrier assembly member 146, at a reduced (underdrive) speed, since the ring gear member 144 is continuously grounded. The speed of the planet carrier assembly member 146 and the output shaft 19 is determined by the speed of the sun gear member 142 (input speed) and the tooth ratio of the planetary gear set 140. The overall numerical value of the first forward speed ratio is determined by the tooth ratio of the planetary gear set 140.

The second forward speed ratio is established by the engagement of the torque transmitting mechanisms 154 and 158. A first to second single transition interchange can be accomplished with the interchange of the torque transmitting mechanisms 150 and 154 while the torque transmitting mechanism 158 remains engaged. The torque transmitting mechanism 154 selectively interconnects the ring gear member 124 and the sun gear member 142. The ring gear member 134 and the sun gear member 122 are rotated in reverse at a reduced speed determined by the speed of the sun gear member 142 and the tooth ratio of the planetary gear set 130. The ring gear member 124 and the sun gear member 142 are rotated forwardly at an increased speed determined by the speed of the planet carrier assembly member 126, the sun gear member 122 and the tooth ratio of the planetary gear set 120. The planet carrier assembly member 146 and the output shaft 19 are rotated forwardly at a reduced speed determined by the speed of the sun gear member 142 and the tooth ratio of the planetary gear set 140. The overall numerical value of the second forward speed ratio is determined by the tooth ratios of the planetary gear sets 120, 130, and 140.

The third forward speed ratio is established by the engagement of the torque transmitting mechanisms 154 and 152. A two/three single transition interchange is attained by the interchange of the torque transmitting mechanisms 158 and 152. The engagement of the torque transmitting mechanisms 152 and 154 places the planetary gear sets 120 and 130 in a one to one condition resulting in a direct drive at the planet carrier assembly member 136 and the output shaft 19.

The fourth forward speed ratio is determined by the engagement of the torque transmitting mechanisms 152 and 156. A three/four single transition interchange is accomplished by the interchange of the torque transmitting mechanisms 154 and 156. The torque transmitting mechanism 156 interconnects the ring gear member 124 and the planet carrier assembly member 146. The speed of the ring gear member 124 is determined by the speed of the sun gear member 142 and the tooth ratio of the planetary gear set 140. The speed of the sun gear member 122 is determined by the speed of the planet carrier assembly member 126, the speed of the ring gear member 124 and the tooth ratio of the planetary gear set 120. The speed of the planet carrier assembly member 136 and the output shaft 19 is determined by the speed of the sun gear member 132, the speed of the ring gear member 134 and the tooth ratio of the planetary gear set 130. The overall numerical ratio of the fourth forward speed ratio is determined by the tooth ratios of the planetary gear sets 120, 130, and 140. Those skilled in the art will recognize that the fourth ratio can be depicted in a lever diagram wherein the ring gear member 144 is the reaction node, the sun gear member 132 and planet carrier assembly member 126 are the input node and the planet carrier assembly member 136 is the output node.

The fifth forward speed ratio is established with the engagement of the torque transmitting mechanisms 150 and 156. A single transition four/five interchange is accomplished by the interchange of the torque transmitting mechanisms 152 and 150. The torque transmitting mechanism 150 selectively interconnects the input shaft 17 with the sun gear member 142. The planet carrier assembly member 146 and the ring gear member 124 are driven forwardly at a reduced speed determined by the speed of the sun gear member 142 and the tooth ratio of the planetary gear set 140. The sun gear member 122 and the ring gear member 134 are driven forwardly at an increased speed determined by the speed of the planet carrier assembly member 126, the speed of the ring gear member 124 and the tooth ratio of the planetary gear set 120. The planet carrier assembly member 136 and the output shaft 19 are driven forwardly at an increased speed determined by the speed of the sun gear member 132, the speed of the ring gear member 134, and the tooth ratio of the planetary gear set 130. The overall numerical value of the fifth forward speed ratio is determined by the tooth ratios of the planetary gear sets 120, 130, and 140.

The sixth forward speed ratio is established with the engagement of the torque transmitting mechanisms 154 and 156. The five/six interchange is a single transition interchange. The ring gear member 124 is held stationary and the sun gear member 122 and the ring gear member 134 are driven forwardly at an increased speed determined by the speed of the planet carrier assembly member 126 and the tooth ratio of the planetary gear set 120. The planet carrier assembly member 136 and the output shaft 19 are driven forwardly at an increased speed determined by the speed of the sun gear member 132, the speed of the ring gear member 134, and the tooth ratio of the planetary gear set 130. The overall numerical value of the sixth forward speed ratio is determined by the tooth ratios of the planetary gear sets 120 and 130.

The truth table in FIG. 4 describes the interchange sequence of the torque transmitting mechanisms 150, 152, 154, 156, and 158 for the forward ratios and the reverse ratio. The numerical values given are computed from the tooth ratios of the planetary gear sets 120, 130, and 140 as given in FIG. 4. The tooth ratio R1/S1 is for the ratio of the ring gear member 124 to the sun gear member 122 of the planetary gear set 120, the tooth ratio R2/S2 is for the ratio of the ring gear member 134 to the sun gear member 132 of the planetary gear set 130, and the tooth ratio R3/S3 is for the ratio of the ring gear member 144 to the sun gear member 142 of the planetary gear set 140. The value of the ratio steps is also given in FIG. 4. For example, the numerical step between the first ratio and the second ratio is 1.4 when the given tooth ratios are employed.

Figures 5, 6:
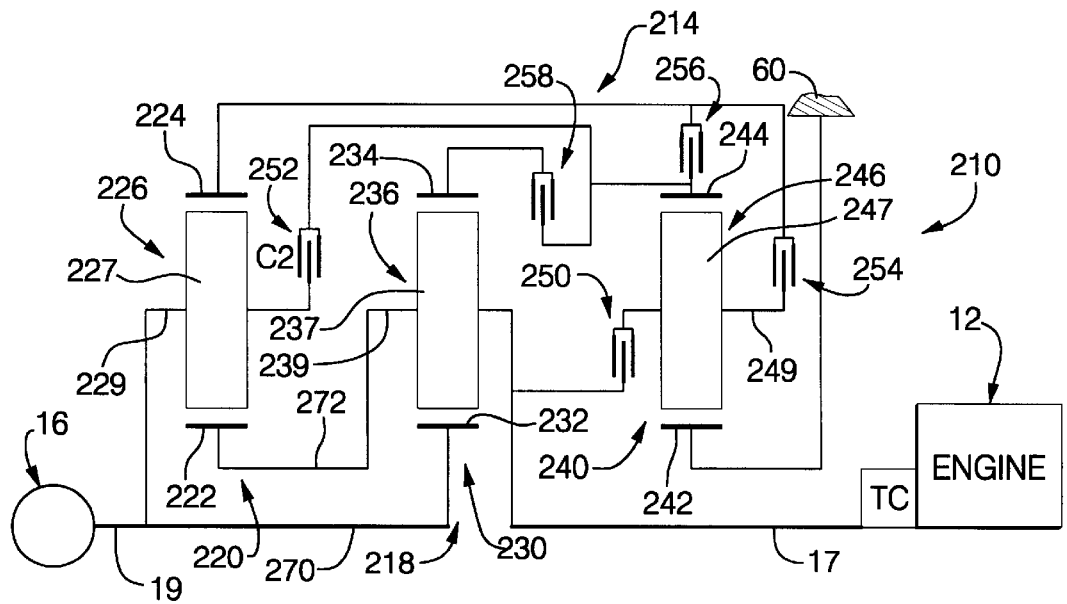
FIG. 5 is schematic representation of a powertrain incorporating another embodiment of the present invention.
FIG. 6 is a truth table and chart describing some of the operating characteristics of the powertrain depicted in FIG. 5.

A powertrain 210, shown in FIG. 5, includes the engine and torque converter 12, a multi-speed transmission 214, and the final drive mechanism 16. The transmission 214 incorporates the input shaft 17, a planetary gear arrangement 218, and the output shaft 19. The input shaft 17 is continuously connected with the engine and torque converter 12, and the output shaft 19 is continuously connected with the final drive mechanism 16. The planetary gear arrangement 218 includes first, second, and third simple planetary gear sets 220, 230, and 240; five conventional fluid operated torque transmitting mechanisms 250, 252, 254, 256, and 258; a first interconnection 270; and a second interconnection 272.

The first planetary gear set 220 has a sun gear member 222, a ring gear member 224, and a planet carrier assembly member 226 that includes a plurality of pinion gears 227 rotatably mounted on a carrier 229 and disposed in meshing relation with the sun gear member 222 and the ring gear member 224. The second planetary gear set 230 has a sun gear member 232, a ring gear member 234, and a planet carrier assembly member 236 that includes a plurality of pinion gears 237 rotatably mounted on a carrier 239 and disposed in meshing relation with the sun gear member 232 and the ring gear member 234. The third planetary gear set 240 has a sun gear member 242, a ring gear member 244, and a planet carrier assembly member 246 that includes a plurality of pinion gears 247 rotatably mounted on a carrier 249 and disposed in meshing relation with the sun gear member 242 and the ring gear member 244. The first interconnection 270 continuously interconnects the output shaft 19, the planet carrier assembly member 226, and the sun gear member 232. The second interconnection 272 continuously interconnects the input shaft 17, the sun gear member 222, and the planet carrier assembly member 236. The sun gear member 242 is continuously connected with housing 60. The torque transmitting mechanism 250 selectively interconnects the second interconnection 272 and the planet carrier assembly member 246. The torque transmitting mechanism 252 selectively interconnects the first interconnection and the ring gear member 244. The torque transmitting mechanism 254 selectively interconnects the planet carrier assembly member 246 and the ring gear member 224. The torque transmitting mechanism 256 selectively interconnects the ring gear member 244 and the ring gear member 224. The torque transmitting mechanism 258 selectively interconnects the ring gear member 234 and the ring gear member 244.

As seen in FIG. 6, the torque transmitting mechanisms 250, 252, 254, 256, and 258 are engaged in combinations of two to provide six forward drive ratios and a reverse drive ratio. A neutral condition is also provided. The reverse drive ratio is established with the engagement of the torque transmitting mechanisms 250 and 258. During the reverse drive ratio, the ring gear member 244 and the planet carrier assembly member 236 are driven forwardly at a speed determined by the speed of the planet carrier assembly member 246, which is connected with the input shaft 17, and the tooth ratio of the planetary gear set 240. The sun gear member 232 and the output shaft 19 are driven in reverse at a reduced speed determined by the speed of the planet carrier assembly member 236, the speed of the ring gear member 234 and the tooth ratio of the planetary gear set 230. The numerical value of the reverse speed ratio is determined by the tooth ratios of the planetary gear sets 230 and 240.

The first forward speed ratio is determined by the engagement of the torque transmitting mechanisms 254 and 256. As pointed out above, torque transmitting mechanism 254 interconnects the planet carrier assembly member 246 and the ring gear member 224, and torque transmitting mechanism 256 interconnects the ring gear member 244 with the ring gear member 224. This will cause the ring gear member 224 to be stationary. The planet carrier assembly member 226 and the output shaft 19 are driven forwardly at a speed determined by the speed of the sun gear member 222 and the tooth ratio of the planetary gear set 220. The numerical value of the first forward speed ratio is determined by the tooth ratio of the planetary gear set 220.

The second forward speed ratio is established with the engagement of the torque transmitting mechanisms 252 and 254. A one/two interchange is a single transition interchange. The torque transmitting mechanism 252 interconnects the ring gear member 244 with the output shaft 19. The ring gear member 224 and the planet carrier assembly member 246 are driven forwardly at a reduced speed determined by the speed of the sun gear member 222 and the tooth ratios of the planetary gear sets 220 and 240. The ring gear member 244, the sun gear member 232, the planet carrier assembly member 226, and the output shaft are driven forwardly at a reduced speed determined by the speed of the planet carrier assembly member 246 and the tooth ratio of the planetary gear set 240. The numerical value of the second forward speed ratio is determined by the tooth ratios of the planetary gear sets 220 and 240.

The third forward speed ratio is established by the engagement of the torque transmitting mechanism 254 and 258. The two/three interchange is a single transition shift. The torque transmitting mechanism 258 interconnects the ring gear member 234 and the ring gear member 244. The ring gear members 234 and 244 are driven forwardly at a speed determined by the speed of the planet carrier assembly member 236 and the tooth ratios of the planetary gear sets 230 and 240. The planet carrier assembly member 226 and the output shaft 19 are driven forwardly at a reduced speed determined by the speed of the sun gear member 222, the speed of the ring gear member 224, and the tooth ratio of the planetary gear set 220. The numerical value of the third forward speed ratio is determined by the tooth ratios of the planetary gear sets 220, 230, and 240.

The fourth forward speed ratio is established with the engagement of the torque transmitting mechanisms 250 and 254. The three/four interchange is a single transition ratio interchange. In the alternative, the fourth forward speed ratio can be attained with the engagement of the torque transmitting mechanisms 256 and 258 which is also a single transition three/four ratio interchange. The torque transmitting mechanism 250 interconnects the input shaft and the planet carrier assembly member 246. This effectively connects both the sun gear member 222 and the ring gear member 224 with the input shaft 17 an therefore establishes a one to one ratio between the input shaft 17 and the output shaft 19. The alternative fourth ratio selection will also produce a one to one ratio in the planetary gear arrangement 218.

The fifth forward speed ratio is established with the engagement of the torque transmitting mechanisms 250 and 256. The four/five interchange is a single transition ratio interchange regardless of which fourth ratio establishment is selected. The ring gear members 244 and 224 are rotated forwardly at an increased speed determined by the speed of the planet carrier assembly member 246 (input speed) and the tooth ratio of the planetary gear set 240. The planet carrier assembly member 226 and the output shaft 19 are driven forwardly at an increased speed determined by the speed of the sun gear member 222, the speed of the ring gear member 224 and the tooth ratio of the planetary gear set 220. The numerical value of the fifth forward speed ratio is determined by the tooth ratios of the planetary gear sets 240 and 220.

The sixth forward speed ratio is established with the engagement of the torque transmitting mechanisms 250 and 252. The five/six interchange is a single transition ratio interchange. The planet carrier assembly member 246 is driven forwardly by the input shaft 17. The ring gear member 244, the planet carrier assembly member 226, and the output shaft 19 are driven forwardly at an increased speed determined by the speed of the planet carrier assembly member 246 and the tooth ratio of the planetary gear set 240. The numerical value of the sixth forward speed ratio is determined by the tooth ratio of the planetary gear set 240.

The truth table in FIG. 6 describes the interchange sequence of the torque transmitting mechanisms 250, 252, 254, 256, and 258 for the forward ratios and the reverse ratio. The numerical values given are computed from the tooth ratios of the planetary gear sets 220, 230, and 240 as given in FIG. 6. The tooth ratio R1/S1 is for the ratio of the ring gear member 224 to the sun gear member 222 of the planetary gear set 220, the tooth ratio R2/S2 is for ratio of the ring gear member 234 to the sun gear member 232 of the planetary gear set 230, and the tooth ratio R3/S3 is for the ratio of the ring gear member 244 to the sun gear member 242 of the planetary gear set 240. The value of the ratio steps is also given in FIG. 6. For example, the numerical step between the first ratio and the second ratio is 1.77 when the given tooth ratios are employed.

Figures 7, 8:
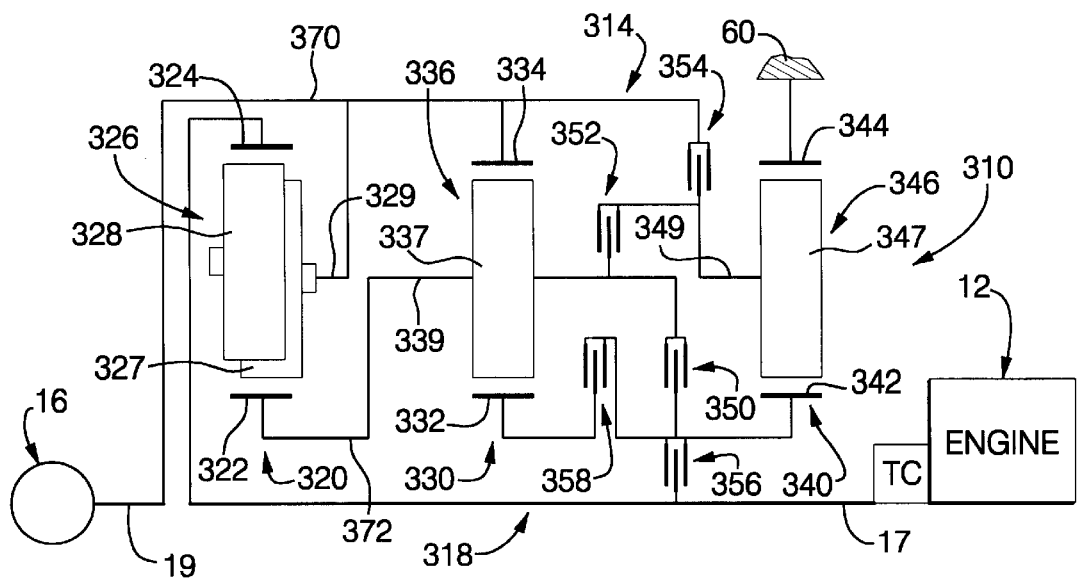
FIG. 7 is schematic representation of a powertrain incorporating another embodiment of the present invention.
FIG. 8 is a truth table and chart describing some of the operating characteristics of the powertrain depicted in FIG. 7.

A powertrain 310, shown in FIG. 7, includes the engine and torque converter 12, a multi-speed transmission 314, and the final drive mechanism 16. The transmission 314 incorporates the input shaft 17, a planetary gear arrangement 318, and the output shaft 19. The input shaft 17 is continuously connected with the engine and torque converter 12 and the output shaft 19 is continuously connected with the final drive mechanism 16. The planetary gear arrangement 318 includes first, second, and third planetary gear sets 320, 330, and 340; five conventional fluid operated torque transmitting mechanisms 350, 352, 354, 356, and 358; a first interconnection 370; and a second interconnection 372.

The first planetary gear set 320 is a compound gear set having a sun gear member 322, a ring gear member 324, and a planet carrier assembly member 326 that includes a plurality of intermeshing pinion gears 327 and 328 rotatably mounted on a carrier 329 and meshing with the sun gear member 322 and the ring gear member 324, respectively. With a compound gear set, the sun gear member and the ring gear member rotate in the same direction when the carrier of the planet carrier assembly member is held stationary and one of the sun or ring gear members is rotated. The second planetary gear set 330 is a simple planetary gear set having a sun gear member 332, a ring gear member 334, and a planet carrier assembly member 336 that includes a plurality of pinion gears 337 rotatably mounted on a carrier 339 and disposed in meshing relation with the sun gear member 332 and the ring gear member 334. The third planetary gear set 340 is a simple planetary gear set having a sun gear member 342, a ring gear member 344, and a planet carrier assembly member 346 that includes a plurality of pinion gears 347 rotatably mounted on a carrier 349 and disposed in meshing relation with the sun gear member 342 and the ring gear member 344.

The input shaft 17 is continuously connected with the ring gear member 324, and the output shaft 19 is continuously connected with the planet carrier assembly member 326 and the ring gear member 334 through the first interconnection 370. The ring gear member 344 is continuously connected with the housing 60. The sun gear member 322 and the planet carrier assembly member 336 are continuously interconnected by the second interconnection 372. The torque transmitting mechanism 350 selectively interconnects the sun gear member 342 and the second interconnection 372. The torque transmitting mechanism 352 selectively interconnects the planet carrier assembly member 346 and the second interconnection 372. The torque transmitting mechanism 354 selectively interconnects the planet carrier assembly member 346 and the first interconnection 370. The torque transmitting mechanism 356 selectively interconnects the input shaft 17 and the ring gear member 324 with the sun gear member 342. The torque transmitting mechanism 358 selectively interconnects the sun gear member 332 and the sun gear member 342.

As seen in FIG. 8, the torque transmitting mechanisms 350, 352, 354, 356, and 358 are engaged in combinations of two to provide six forward drive ratios and a reverse drive ratio. A neutral condition is also provided. The reverse drive ratio is established with the engagement of the torque transmitting mechanisms 352 and 358. The sun gear member 322, the planet carrier assembly member 336 and the planet carrier assembly member 346 are driven forwardly at a speed determined by the speed of the ring gear member 324 and the tooth ratio of the planetary gear set 320. The sun gear member 342 and the sun gear member 332 are driven forwardly at a speed determined by the speed of the planet carrier assembly member 346 and the tooth ratio of the planetary gear set 340. The ring gear member 334 and the output shaft 19 are driven in reverse at a reduced speed determined by the speed of the sun gear member 332 and the tooth ratio of the planetary gear set 330. The numerical value of the reverse speed ratio is determined by the tooth ratios of the planetary gear sets 320, 330, and 340.

The first forward speed ratio is established with the engagement of the torque transmitting mechanisms 354 and 356. The sun gear member 342 is driven forwardly by the input shaft 17. The planet carrier assembly member 346, the first interconnection 370 and the output shaft 19 are driven forwardly at a reduced speed determined by the speed of the sun gear member 340 and the tooth ratio of the planetary gear set 340. The numeric value of the first forward speed ratio is determined by the tooth ratio of the planetary gear set 340.

The second forward speed ratio is established with the engagement of the torque transmitting mechanisms 350 and 354. The one/two ratio interchange is a single transition ratio interchange. The sun gear member 322 and the sun gear member 342 are driven forwardly at a speed determined by the speed of the ring gear member 324 and the tooth ratio of the planetary gear set 320. The planet carrier assembly member 346, the first interconnection 370, and the output shaft 19 are driven forwardly at a reduced ratio determined by the speed of the sun gear member 342 and the tooth ratio of the planetary gear set 340. The numerical value of the second forward speed ratio is determined by the tooth ratios of the planetary gear sets 320 and 340.

The third forward speed ratio is established by the engagement of the torque transmitting mechanisms 354 and 358. The two/three interchange is a single transition ratio interchange. The sun gear member 322 and the planet carrier assembly member 336 are driven forwardly at a speed determined by the speed of the ring gear member 324 and the tooth ratio of the planetary gear set 320. The sun gear member 332 and the sun gear member 342 are driven forwardly at a speed determined by the speed of the planet carrier assembly member 336 and the tooth ratio of the planetary gear set 330. The planet carrier assembly member 346, the first interconnection 370 and the output shaft 19 are driven forwardly at a speed determined by the speed of the sun gear member 342 and the tooth ratio of the planetary gear set 340. The numerical value of the third forward speed ratio is determined by the tooth ratios of the planetary gear sets 320, 330, and 340.

The fourth forward speed ratio is established by the engagement of the torque transmitting mechanisms 356 and 358. This effectively interconnects all three members of the planetary gear sets 320 and 330 to place the planetary gear arrangement 318 in a one to one ratio. An alternative fourth forward speed ratio is established by the engagement of the torque transmitting mechanisms 352 and 354 which effectively interconnects all three members of the planetary gear set 320. Both of the above described fourth forward speed ratios permit a single transition three/four ratio interchange.

The fifth forward speed ratio is established by the engagement of the torque transmitting mechanisms 352 and 356. This is a single transition four/five ratio interchange from either of the above described fourth forward speed ratios. The planet carrier assembly member 346 and the sun gear member 322 are driven forwardly at a speed determined by the speed of the sun gear member 342 (input speed) and the tooth ratio of the planetary gear set 340. The planet carrier assembly member 326 and the output shaft 19 are driven forwardly at an increased speed determined by the speed of the sun gear member 322, the speed of the ring gear member 324 and the tooth ratio of the planetary gear set 320. The numerical value of the fifth forward speed ratio is determined by the tooth ratios of the planetary gear sets 320 and 340.

The sixth forward speed ratio is established by the engagement of the torque transmitting mechanisms 350 and 352. The five/six ratio interchange is a single transition interchange. The engagement of the torque transmitting mechanisms 350 and 352 effectively connect the sun gear member 322 with the housing 60 through the planet carrier assembly member 336 and the planetary gear set 340. The planet carrier assembly member 326 is driven forwardly at an increased speed determined by the speed of the ring gear member 324 and the tooth ratio of the planetary gear set 320. The numerical value of the sixth forward speed ratio is determined by the tooth ratio of the planetary gear set 320.

The truth table in FIG. 8 describes the interchange sequence of the torque transmitting mechanisms 350, 352, 354, 356, and 358 for the forward ratios and the reverse ratio. The numerical values given are computed from the tooth ratios of the planetary gear sets 320, 330, and 340 as given in FIG. 8. The tooth ratio R1/S1 is for the ratio of the ring gear member 324 to the sun gear member 322 of the planetary gear set 320, the tooth ratio R2/S2 is for ratio of the ring gear member 334 to the sun gear member 332 of the planetary gear set 330, and the tooth ratio R3/S3 is for the ratio of the ring gear member 344 to the sun gear member 342 of the planetary gear set 340. The value of the ratio steps is also given in FIG. 8. For example, the numerical step between the first ratio and the second ratio is 1.77 when the given tooth ratios are employed.

Figures 9, 10:
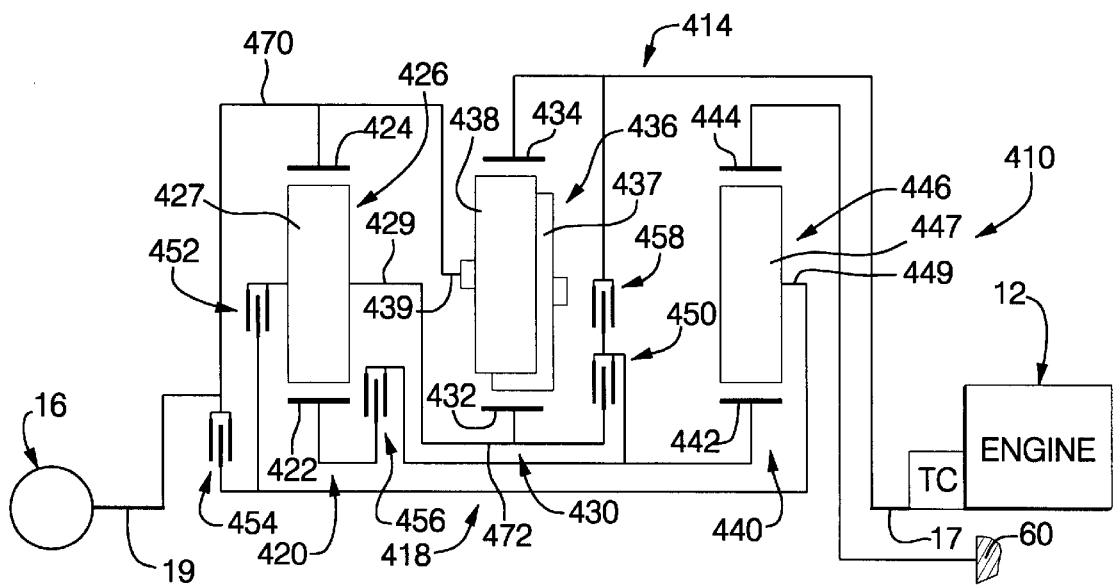
FIG. 9 is schematic representation of a powertrain incorporating another embodiment of the present invention.
FIG. 10 is a truth table and chart describing some of the operating characteristics of the powertrain depicted in FIG. 9.

A powertrain 410, shown in FIG. 9, includes the engine and torque converter 12, a multi-speed transmission 414, and the final drive mechanism 16. The transmission 414 incorporates the input shaft 17, a planetary gear arrangement 418, and the output shaft 19. The input shaft 17 is continuously connected with the engine and torque converter 12 and the output shaft 19 is continuously connected with the final drive mechanism 16. The planetary gear arrangement 418 includes first, second, and third planetary gear sets 420, 430, and 440; five conventional fluid operated torque transmitting mechanisms 450, 452, 454, 456, and 458; a first interconnection 470; and a second interconnection 472.

The first planetary gear set 420 is a simple gear set having a sun gear member 422, a ring gear member 424, and a planet carrier assembly member 426 that includes a plurality of pinion gears 427 rotatably mounted on a carrier 429 and meshing with both the sun gear member 422 and the ring gear member 424. The second planetary gear set 430 is a compound planetary gear set having a sun gear member 432, a ring gear member 434, and a planet carrier assembly member 436 that includes a plurality of intermeshing pinion gears 437 and 438 rotatably mounted on a carrier 439 and disposed in meshing relation with the sun gear member 432 and the ring gear member 434, respectively. The third planetary gear set 440 is a simple planetary gear set having a sun gear member 442, a ring gear member 444, and a planet carrier assembly member 446 that includes a plurality of pinion gears 447 rotatably mounted on a carrier 449 and disposed in meshing relation with the sun gear member 442 and the ring gear member 444.

The input shaft 17 is continuously connected between the engine and torque converter 12 and the ring gear member 434, and the output shaft 19 is continuously connected between the final drive mechanism 16 and the first interconnection 470. The planet carrier assembly member 426 is continuously connected with the sun gear member 432 by the second interconnection 472. The ring gear member 444 is continuously connected with the housing 60. The torque transmitting mechanism 450 selectively interconnects the sun gear member 442 and the second interconnection 472. The torque transmitting mechanism 452 selectively interconnects the second interconnection 472 with the planet carrier assembly member 446. The torque transmitting mechanism 454 selectively interconnects the output shaft 19 with the planet carrier assembly member 446. The torque transmitting mechanism 456 selectively interconnects the sun gear member 422 with the sun gear member 442. The torque transmitting mechanism 458 selectively interconnects the sun gear member 442 with the input shaft 17.

As seen in FIG. 10, the torque transmitting mechanisms 450, 452, 454, 456, and 458 are engaged in combinations of two to provide six forward drive ratios and a reverse drive ratio. A neutral condition is also provided. The reverse drive ratio is established with the engagement of the torque transmitting mechanisms 452 and 456. The second interconnection 472 is connected with the planet carrier assembly member 446 and the sun gear member 422 is connected with the sun gear member 442. The sun gear member 432, the planet carrier assembly member 426 and the planet carrier assembly member 446 are driven forwardly at a speed determined by the speed of the ring gear member 436 and the tooth ratio of the planetary gear set 430. The sun gear member 442 and the sun gear member 422 are driven forwardly at a speed determined by the speed of the planet carrier assembly member 446 and the tooth ratio of the planetary gear set 440. The ring gear member 424 and the output shaft 19 are driven in reverse at a reduced ratio at a speed determined by the speed of the sun gear member 422, the speed of the planet carrier assembly member 426 and the tooth ratio of the planetary gear set 420. The numerical value of the reverse speed ratio is determined by the tooth ratios of the planetary gear sets 420, 430, and 440.

The first forward speed ratio is established by the engagement of the torque transmitting mechanisms 454 and 458. The planet carrier assembly member 446 is connected with the output shaft 19 and the sun gear member 442 is connected with the input shaft 17. The planet carrier assembly member 446 and the output shaft 19 are driven at a reduced speed determined by the speed of the sun gear member 442 and the tooth ratio of the planetary gear set 440. The numerical value of the first forward speed ratio is determined by the tooth ratio of the planetary gear set 440.

The second forward speed ratio is established with the engagement of the torque transmitting mechanisms 450 and 454. The one/two ratio interchange is a single transition interchange. The sun gear member 442 is connected with the second interconnection 472 and the planet carrier assembly member 446 remains connected with the output shaft 19. The sun gear member 432 and the sun gear member 442 are driven forwardly at a speed determined by the speed of the ring gear member 434 and the tooth ratio of the planetary gear set 430. The planet carrier assembly member 446 and the output shaft are driven forwardly at a reduced speed determined by the speed of the sun gear member 442 and the tooth ratio of the planetary gear set 440. The numerical value of the second forward speed ratio is determined by the tooth ratios of the planetary gear sets 430 and 440.

The third forward speed ratio is established with the engagement of the torque transmitting mechanisms 454 and 456. The two/three interchange is a single transition ratio interchange. The sun gear member 442 is connected with the sun gear member 422 and the planet carrier assembly member 446 remains connected with the output shaft 19. The sun gear member 432 and the planet carrier assembly member 426 are driven forwardly at a speed determined by the speed of the ring gear member 434 and the tooth ratio of the planetary gear set 430. The sun gear member 422 and the sun gear member 442 are driven forwardly at a speed determined by the speed of the planet carrier assembly member 426 and the tooth ratio of the planetary gear set 420. The planet carrier assembly member 446 and the output shaft 19 are driven forwardly at a reduced speed determined by the speed of the sun gear member 442 and the tooth ratio of the planetary gear set 440. The numerical value of the third forward speed ratio is determined by the tooth ratios of the planetary gear sets 420, 430, and 440.

The fourth forward speed ratio is established with the engagement of the torque transmitting mechanisms 456 and 458. The input shaft 17 is connected with the sun gear member 422. This effectively interconnects the three members of the planetary gear set 430 with the three members of the planetary gear set 420 which results in a one to one ratio. An alternative selection of torque transmitting mechanisms 452 and 454 will also produce a one to one ratio. In either event, the three/four interchange is a single transition interchange.

The fifth forward speed ratio is established with the engagement of the torque transmitting mechanisms 452 and 458. The four/five interchange is a single transition regardless of the torque transmitting mechanism selection for the fourth ratio. The torque transmitting mechanism 452 selectively interconnects the second interconnection 472 with the planet carrier assembly member 446 and the torque transmitting mechanism 458 selectively interconnects the input shaft 17 and the sun gear member 442. The planet carrier assembly member 446 and the sun gear member 432 are driven forwardly at a speed determined by the speed of the sun gear member 442 and the tooth ratio of the planetary gear set 440. The planet carrier assembly member 436 and the output shaft 19 are driven forwardly at an increased speed determined by the speed of the sun gear member 432, the speed of the ring gear member 434, and the tooth ratio of the planetary gear set 430. The numerical value of the fifth forward speed ratio is determined by the tooth ratios of the planetary gear sets 430 and 440.

The sixth forward speed ratio is established with the engagement of the torque transmitting mechanisms 450 and 452. The five/six interchange is a single transition interchange. The torque transmitting mechanism 450 selectively interconnects the sun gear member 442 and the second interconnection 472. The torque transmitting mechanism 452 selectively interconnects the planet carrier assembly member 446 and the second interconnection 472. Since the sun gear member 442 and the planet carrier assembly member 446 are interconnected, the second interconnection 472 is stationary. The planet carrier assembly member 436 and the output shaft 19 are driven forwardly at an increased speed determined by the speed of the ring gear member 434 and the tooth ratio of the planetary gear set 430.

The truth table in FIG. 10 describes the interchange sequence of the torque transmitting mechanisms 450, 452, 454, 456, and 458 for the forward ratios and the reverse ratio. The numerical values given are computed from the tooth ratios of the planetary gear sets 420, 430, and 440 as given in FIG. 10. The tooth ratio R1/S1 is for the ratio of the ring gear member 424 to the sun gear member 422 of the planetary gear set 420, the tooth ratio R2/S2 is for ratio of the ring gear member 434 to the sun gear member 432 of the planetary gear set 430, and the tooth ratio R3/S3 is for the ratio of the ring gear member 444 to the sun gear member 442 of the planetary gear set 440. The value of the ratio steps is also given in FIG. 10. For example, the numerical step between the first ratio and the second ratio is 1.8 when the given tooth ratios are employed.

Figures 11, 12:
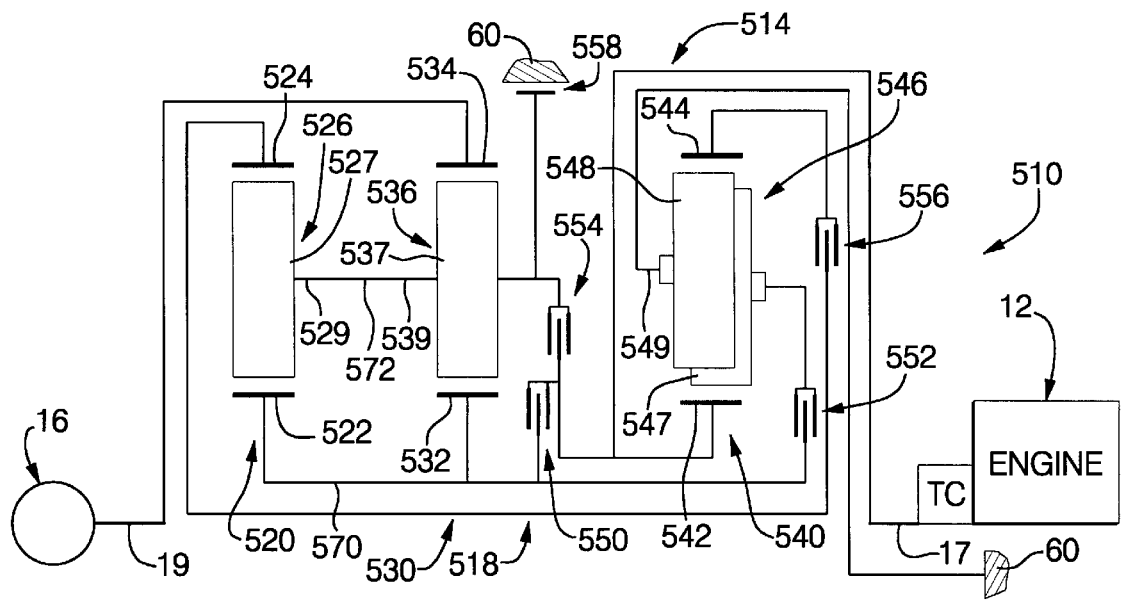
FIG. 11 is schematic representation of a powertrain incorporating another embodiment of the present invention.
FIG. 12 is a truth table and chart describing some of the operating characteristics of the powertrain depicted in FIG. 11.

A powertrain 510, shown in FIG. 11, includes the engine and torque converter 12, a multi-speed transmission 514, and the final drive mechanism 16. The transmission 514 incorporates the input shaft 17, a planetary gear arrangement 518, and the output shaft 19. The input shaft 17 is continuously connected with the engine and torque converter 12 and the output shaft 19 is continuously connected with the final drive mechanism 16. The planetary gear arrangement 518 includes first, second, and third planetary gear sets 520, 530, and 540; five conventional fluid operated torque transmitting mechanisms 550, 552, 554, 556, and 558; a first interconnection 570; and a second interconnection 572. The torque transmitting mechanisms 550, 552, 554, and 556 are of the rotating type commonly termed clutches and the torque transmitting mechanism 558 is of the stationary type commonly termed a brake.

The first planetary gear set 520 is a simple planetary gear set having a sun gear member 522, a ring gear member 524, and a planet carrier assembly member 526 that includes a plurality of pinion gears 527 rotatably mounted on a carrier 529 and meshing with both the sun gear member 522 and the ring gear member 524. The second planetary gear set 530 is a simple planetary gear set having a sun gear member 532, a ring gear member 534, and a planet carrier assembly member 536 that includes a plurality of pinion gears 537 rotatably mounted on a carrier 539 and disposed in meshing relation with both the sun gear member 532 and the ring gear member 534. The third planetary gear set 540 is a compound planetary gear set having a sun gear member 542, a ring gear member 544, and a planet carrier assembly member 546 that includes a plurality of intermeshing pinion gears 547 and 548 rotatably mounted on a carrier 549 and disposed in meshing relation with the sun gear member 542 and the ring gear member 544, respectively.

The input shaft 17 is continuously connected between the engine and torque converter 12 and the sun gear member 542, and the output shaft 19 is continuously connected between the final drive mechanism 16 and the ring gear member 534. The sun gear members 522 and 532 are continuously interconnected by the first interconnection 570. The planet carrier assembly members 426 and 536 are continuously interconnected by the second interconnection 572. The planet carrier assembly member 546 is continuously connected with the housing 60. The torque transmitting mechanism 550 selectively interconnects the first interconnection 570 with the sun gear member 542 and therefore the input shaft 17. The torque transmitting mechanism 552 selectively interconnects the first interconnection 570 with the planet carrier assembly member 546 and therefore to the housing 60. The torque transmitting mechanism 554 selectively interconnects the second interconnection 572 with the sun gear member 542 and therefore the input shaft 17. The torque transmitting mechanism 556 selectively interconnects the ring gear member 544 and the ring gear member 524. The torque transmitting mechanism 558 selectively interconnects the housing 60 and the second interconnection 572.

As seen in FIG. 12, the torque transmitting mechanisms 550, 552, 554, 556, and 558 are engaged in combinations of two to provide six forward drive ratios and a reverse drive ratio. A neutral condition is also provided. The reverse speed ratio is established with the engagement of the torque transmitting mechanisms 550 and 558. The input shaft 17 is connected with the first interconnection 570 and the second interconnection is connected to ground at housing 60. The sun gear member 532 is driven forwardly by the input shaft 17 and the ring gear member 534 is driven in reverse at a reduced speed determined by the speed of the sun gear member 532 and the tooth ratio of the planetary gear set 530.

The numerical value of the reverse ratio is determined by the planetary gear set 530.

The first forward speed ratio is established by the engagement of the torque transmitting mechanisms 556 and 558. It should be noted that the torque transmitting mechanism 558 can remain engaged during neutral. The ring gear members 544 and 524 are interconnected by the torque transmitting mechanism 556. The ring gear members 544 and 524 are driven forwardly at a speed determined by the speed of the sun gear member 542 and the tooth ratio of the planetary gear set 540. The sun gear members 522 and 532 are driven in reverse at a speed determined by the speed of the ring gear member 524 and the tooth ratio of the planetary gear set 520. The ring gear member 534 and the output shaft 19 are driven forwardly at a reduced speed determined by the speed of the sun gear member 532 and the tooth ratio of the planetary gear set 530. The numeric value of the first forward speed ratio is determined by the tooth ratios of the planetary gear sets 520, 530, and 540.

The second forward speed ratio is established with the engagement of the torque transmitting mechanisms 552 and 556. The one/two interchange is a single transition ratio change. The first interconnection 570 is connected with the planet carrier assembly member 546 and therefore the housing 60. The ring gear members 544 and 524 are driven forwardly at a speed determined by the speed of the sun gear member 542 and the tooth ratio of the planetary gear set 540. The planet carrier assembly members 526 and 536 are driven forwardly at a speed determined by the speed of the ring gear member 524 and the tooth ratio of the planetary gear set 520. The ring gear member 534 is driven forwardly at a reduced speed determined by the speed of the planet carrier assembly member 536 and the tooth ratio of the planetary gear set 530. The numerical value of the second forward speed ratio is determined by the tooth ratios of the planetary gear sets 520, 530, and 540.

The third forward speed ratio is established with the engagement of the torque transmitting mechanisms 550 and 556. The two/three interchange is a single transition ratio interchange. The first interconnection 570 and the sun gear member 542 and therefore the input shaft 17 are interconnected by the torque transmitting mechanism 550 and the ring gear members 544 and 524 are interconnected by the torque transmitting mechanism 556. The ring gear members 544 and 524 are driven forwardly at a speed determined by the speed of the sun gear member 542 and the tooth ratio of the planetary gear set 540. The planet carrier assembly members 526 and 536 are driven forwardly at a speed determined by the speed of the ring gear member 524, the speed of the sun gear member 522, and the tooth ratio of the planetary gear set 520. The ring gear member 534 and the output shaft 19 are driven forwardly at a reduced speed determined by the speed of the sun gear member 532, the speed of the planet carrier assembly member 536, and the tooth ratio of the planetary gear set 530. The numerical value of the third forward speed ratio is determined by the tooth ratios of the planetary gear sets 520, 530, and 540.

The fourth forward speed ratio is established with the engagement of the torque transmitting mechanisms 554 and 556. The three/four interchange is a single transition ratio interchange. The second interconnection 572 is connected with the sun gear member 542, and therefore the input shaft 17, by the torque transmitting mechanism 554. The ring gear members 544 and 524 are interconnected by the torque transmitting mechanism 556. The ring gear members 544 and 524 are driven forwardly at a speed determined by the speed of the sun gear member 542 and the tooth ratio of the planetary gear set 540. The sun gear members 522 and 532 are driven forwardly at a speed determined by the speed of the ring gear member 524, the speed of the planet carrier assembly member 526 and the tooth ratio of the planetary gear set 520. The ring gear member 534 and the output shaft 19 are driven forwardly at a reduced speed determined by the speed of the sun gear member 532, the speed of the planet carrier assembly member 536 and the tooth ratio of the planetary gear set 530. The numerical value of the fourth forward speed ratio is determined by the tooth ratios of the planetary gear sets 520, 530, and 540.

The fifth forward speed ratio is established with the engagement of the torque transmitting mechanisms 550 and 554. The four/five ratio interchange is a single transition interchange. The torque transmitting mechanism 550 connects the input shaft 17 with the first interconnection 570. The torque transmitting mechanism 554 connects the second interconnection 572 with the input shaft 17. Thus the sun gear member 532 and the planet carrier assembly member 536 are both driven at input speed resulting in the ring gear member 534 and the output shaft 19 being driven at input speed. The fifth forward speed ratio is a one to one speed ratio.

The sixth forward speed ratio is established with the engagement of the torque transmitting mechanisms 552 and 554. The five/six interchange is a single transition ratio interchange. The torque transmitting mechanism 552 connects the first interconnection with the housing 60 through the planet carrier assembly member 546. The torque transmitting mechanism 554 connects the input shaft 17 with the second interconnection 572. The ring gear member 534 and the output shaft 19 are driven forwardly at an increased speed determined by the speed of the planet carrier assembly member 536 and the tooth ratio of the planetary gear set 530. The numerical value of the sixth forward speed ratio is determined by the tooth ratio of the planetary gear set 530.

The truth table in FIG. 12 describes the interchange sequence of the torque transmitting mechanisms 550, 552, 554, 556, and 558 for the forward ratios and the reverse ratio. The numerical values given are computed from the tooth ratios of the planetary gear sets 520, 530, and 540 as given in FIG. 12. The tooth ratio R1/S1 is for the ratio of the ring gear member 524 to the sun gear member 522 of the planetary gear set 520, the tooth ratio R2/S2 is for ratio of the ring gear member 534 to the sun gear member 532 of the planetary gear set 530, and the tooth ratio R3/S3 is for the ratio of the ring gear member 544 to the sun gear member 542 of the planetary gear set 540. The value of the ratio steps is also given in FIG. 12. For example, the numerical step between the first ratio and the second ratio is 1.51 when the given tooth ratios are employed.

Figures 13, 14:
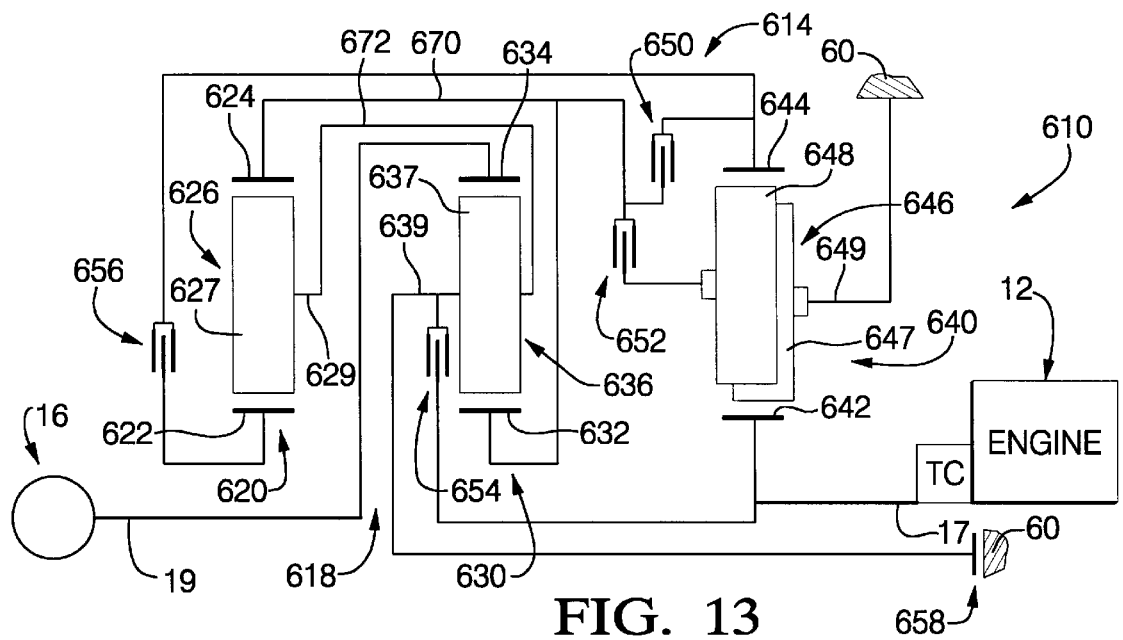
FIG. 13 is schematic representation of a powertrain incorporating another embodiment of the present invention.
FIG. 14 is a truth table and chart describing some of the operating characteristics of the powertrain depicted in FIG. 13.

A powertrain 610, shown in FIG. 13, has the conventional engine and torque converter 12, a planetary transmission 614, and the conventional final drive 16. The engine and torque converter 12 are drivingly connected with the transmission 614 through an input shaft 17. The transmission is drivingly connected with the final drive 16 through an output shaft 19. The planetary transmission 614 includes a planetary gear arrangement 618 that includes a first planetary gear set 620, a second planetary gear set 630 and a third planetary gear set 640. The planetary transmission also includes five torque transmitting mechanism 650, 652, 654, 656, and 658 which are conventional selectively engageable fluid operated devices. The torque transmitting mechanisms 650, 652, 654, and 656 are rotating type mechanisms which are commonly termed clutches. The torque transmitting mechanism 658 is a stationary type mechanism commonly termed brakes. The torque transmitting mechanisms 658 is connected to a stationary component of the transmission 614 such as the housing 60.

The planetary gear set 620 includes a sun gear member 622, a ring gear member 624, and a planet carrier assembly member 626 that has a plurality of planet pinion gear members 627 rotatably mounted on a planet carrier 629 and disposed in meshing relation with the sun gear member 622 and the ring gear member 624. The planetary gear set 630 includes a sun gear member 632, a ring gear member 634, and a planet carrier assembly member 636 that has a plurality of planet pinion gears 637 rotatably mounted on a planet carrier 639 and disposed in meshing relation with the sun gear member 632 and the ring gear member 634. The planetary gear set 640 has a sun gear member 642, a ring gear member 644, and a planet carrier assembly member 646 that includes a plurality of intermeshing planet pinion gears 647 and 648 rotatably mounted on a planet carrier 649 and disposed in meshing relation with the sun gear member 642 and the ring gear member 644, respectively.

The sun gear member 642 is continuously connected with the input shaft 17. The ring gear member 634 is continuously connected with the output shaft 19. The planet carrier assembly member 646 is continuously connected with the housing 60. The ring gear member 624 and the sun gear member 632 are continuously interconnected by an interconnecting member 670. The planet carrier assembly member 626 and the planet carrier assembly member 636 are continuously interconnected by an interconnecting member 672. The torque transmitting mechanism 650 selectively interconnects the ring gear member 644 with the interconnecting member 670. The torque transmitting mechanism 652 selectively interconnects the interconnecting member 670 with the planet carrier assembly member 646 and therefore the housing 60. The torque transmitting mechanism 654 selectively interconnects the interconnecting member 672 with the input shaft 17. The torque transmitting mechanism 656 selectively interconnects the sun gear member 622 and the ring gear member 644. The torque transmitting mechanism 658 selectively interconnects the planet carrier assembly member 636 and the housing 60.

The truth table, shown in FIG. 14, defines the torque transmitting mechanism engagement required for each of the forward speed ratios and the reverse speed ratio. The truth table also indicates that the torque transmitting mechanism 658 can remain engaged during the neutral condition thereby simplifying the first/reverse interchange. The numerical values for the ratios have been determined using the ring/sun tooth ratios given in FIG. 14. The R1/S1 value is the ring/sun tooth ratio of the planetary gear set 620, the R2/S2 value is the ring/sun tooth ratio of the planetary gear set 630, and the R3/S3 value is the ring/sun tooth ratio of the planetary gear set 640. As can be determined from the truth table, the single ratio interchanges for the forward speed ratios are single transition interchanges. Also the double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 14 also describes the step ratio between adjacent ratios for example the numerical step between $1^{st}$ and $2^{nd}$ is 1.55.

Those skilled in the art will recognize that the numerical value of the reverse speed ratio is determined by the planetary gear sets 630 and 640. The numerical value of the first forward speed ratio is determined by the planetary gear sets 620, 630, and 640. The numerical value of the second forward speed ratio is determined by the planetary gear sets 620, 630, and 640. The numerical value of the third forward speed ratio is determined by the planetary gear sets 630 and 640. The numerical value of the fourth forward speed ratio is determined by the planetary gear sets 620, 630, and 640. The numerical value of the fifth forward speed ratio is determined by the planetary gear sets 630 and 640. The numerical value of the sixth forward speed ratio is determined by the planetary gear set 630.

Figures 15, 16:
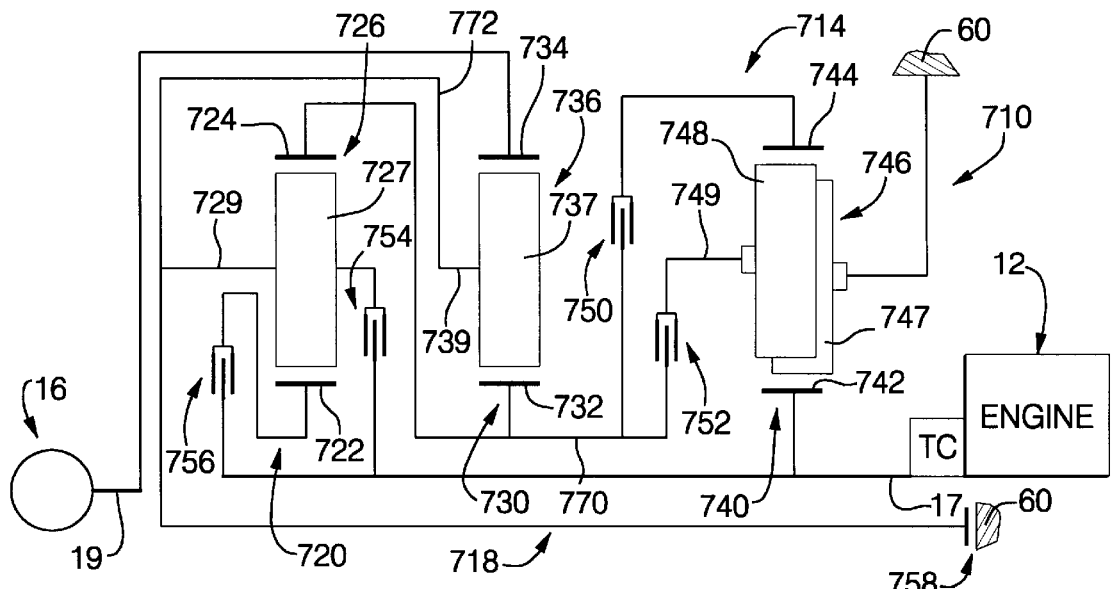
FIG. 15 is schematic representation of a powertrain incorporating another embodiment of the present invention.
FIG. 16 is a truth table and chart describing some of the operating characteristics of the powertrain depicted in FIG. 15.

A powertrain 710, shown in FIG. 15, has the conventional engine and torque converter 12, a planetary transmission 714, and the conventional final drive 16. The engine and torque converter 12 are drivingly connected with the transmission 714 through an input shaft 17. The transmission is drivingly connected with the final drive 16 through an output shaft 19. The planetary transmission 714 includes a planetary gear arrangement 718 that includes a first planetary gear set 720, a second planetary gear set 730 and a third planetary gear set 740. The planetary transmission also includes five torque transmitting mechanisms 750, 752, 754, 756, and 758 which are conventional selectively engageable fluid operated devices. The torque transmitting mechanisms 750, 752, 754, and 756 are rotating type mechanisms which are commonly termed clutches. The torque transmitting mechanism 758 is a stationary type mechanism commonly termed brakes. The torque transmitting mechanism 758 is connected to a stationary component of the transmission 714 such as the housing 60.

The planetary gear set 720 includes a sun gear member 722, a ring gear member 724, and a planet carrier assembly member 726 that has a plurality of planet pinion gear members 727 rotatably mounted on a planet carrier 729 and disposed in meshing relation with the sun gear member 722 and the ring gear member 724. The planetary gear set 730 includes a sun gear member 732, a ring gear member 734, and a planet carrier assembly member 736 that has a plurality of planet pinion gears 737 rotatably mounted on a planet carrier 739 and disposed in meshing relation with the sun gear member 732 and the ring gear member 734. The planetary gear set 740 has a sun gear member 742, a ring gear member 744, and a planet carrier assembly member 746 that includes a plurality of intermeshing planet pinion gears 747 and 748 rotatably mounted on a planet carrier 749 and disposed in meshing relation with the sun gear member 742 and the ring gear member 744, respectively.

The sun gear member 742 is continuously connected with the input shaft 17, the ring gear member 734 is continuously connected with the output shaft 19, and the planet carrier assembly member 746 is continuously connected with the housing 60. The ring gear member 724 and the sun gear member 732 are continuously interconnected by an interconnecting member 770, and the planet carrier assembly member 726 and the planet carrier assembly member 736 are continuously interconnected by an interconnecting member 772. The torque transmitting mechanism 750 selectively interconnects the interconnecting member 770 with the ring gear member 744, the torque transmitting mechanism 752 selectively interconnects the interconnecting member 770 with the planet carrier assembly member 746 and therefore the housing 60, the torque transmitting mechanism 754 selectively interconnects the interconnecting member 772 with the input shaft 17, the torque transmitting mechanism 756 selectively interconnects the sun gear member 722 with the input shaft 17, and the torque transmitting mechanism 758 selectively interconnects the interconnecting member 772 with the housing 60.

The truth table shown in FIG. 16 defines the torque transmitting mechanism engagement sequence required for each of the forward speed ratios and the reverse speed ratio. The truth table also indicates that the torque transmitting mechanism 758 can remain engaged during the neutral condition thereby simplifying the first/reverse interchange. The numerical values for the ratios have been determined using the ring/sun tooth ratios given in FIG. 16. The R1/S1 value is the ring/sun tooth ratio of the planetary gear set 720, the R2/S2 value is the ring/sun tooth ratio of the planetary gear set 730, and the R3/S3 value is the ring/sun tooth ratio of the planetary gear set 740. As can be determined from the truth table, the single ratio interchanges for the forward speed ratios are single transition interchanges. Also the double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 16 also describes the step ratio between adjacent ratios for example the numerical step between $1^{st}$ and $2^{nd}$ is 1.84.

Those skilled in the art will recognize that the numerical value of the reverse speed ratio is determined by the planetary gear sets 730 and 740. The numerical value of the first forward speed ratio is determined by the planetary gear sets 720 and 730. The numerical value of the second forward speed ratio is determined by the planetary gear sets 720 and 730. The numerical value of the third forward speed ratio is determined by the planetary gear sets 720, 730, and 740. The fourth forward speed ratio is a one to one ratio. The numerical value of the fifth forward speed ratio is determined by the planetary gear sets 730 and 740. The numerical value of the sixth forward speed ratio is determined by the planetary gear sets 730.

Figures 17, 18:
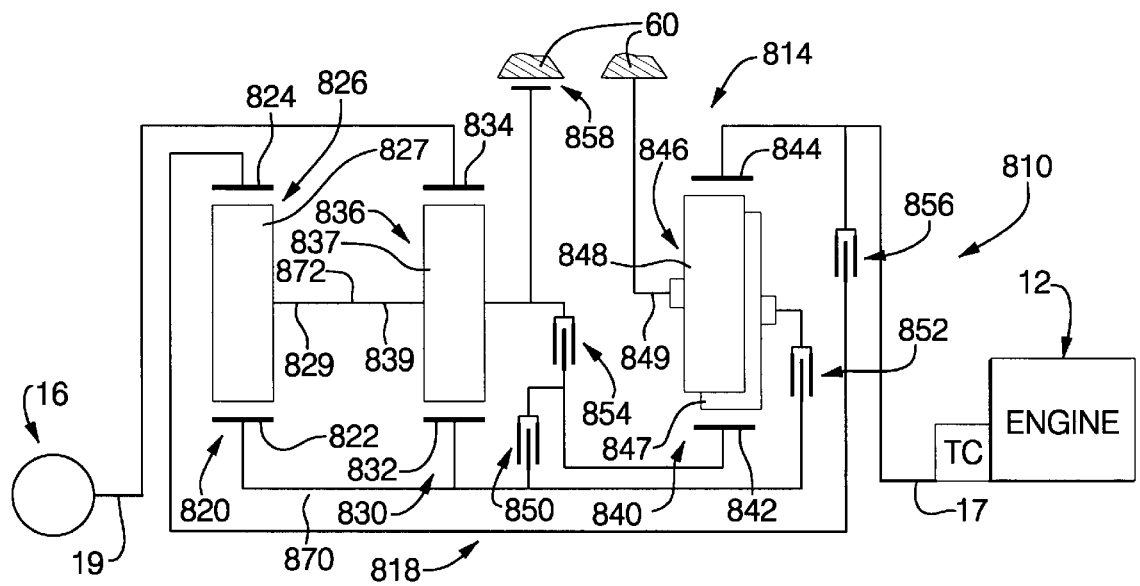
FIG. 17 is schematic representation of a powertrain incorporating another embodiment of the present invention.
FIG. 18 is a truth table and chart describing some of the operating characteristics of the powertrain depicted in FIG. 17.

A powertrain 810, shown in FIG. 17, has the conventional engine and torque converter 12, a planetary transmission 814, and the conventional final drive 16. The engine and torque converter 12 are drivingly connected with the transmission 814 through an input shaft 17. The transmission is drivingly connected with the final drive 16 through an output shaft 19. The planetary transmission 814 includes a planetary gear arrangement 818 that includes a first planetary gear set 820, a second planetary gear set 830 and a third planetary gear set 840. The planetary transmission also includes five torque transmitting mechanism 850, 852, 854, 856, and 858 which are conventional selectively engageable fluid operated devices. The torque transmitting mechanisms 850, 852, 854, and 856 are rotating type mechanisms which are commonly termed clutches. The torque transmitting mechanism 858 is a stationary type mechanism commonly termed brakes. The torque transmitting mechanisms 858 is connected to a stationary component of the transmission 814 such as the housing 60.

The planetary gear set 820 includes a sun gear member 822, a ring gear member 824, and a planet carrier assembly member 826 that has a plurality of planet pinion gear members 827 rotatably mounted on a planet carrier 829 and disposed in meshing relation with the sun gear member 822 and the ring gear member 824. The planetary gear set 830 includes a sun gear member 832, a ring gear member 834, and a planet carrier assembly member 836 that has a plurality of planet pinion gears 837 rotatably mounted on a planet carrier 839 and disposed in meshing relation with the sun gear member 832 and the ring gear member 834. The planetary gear set 840 has a sun gear member 842, a ring gear member 844, and a planet carrier assembly member 846 that includes a plurality of intermeshing planet pinion gears 847 and 848 rotatably mounted on a planet carrier 849 and disposed in meshing relation with the sun gear member 842 and the ring gear member 844, respectively.

The ring gear member 844 is continuously connected with the input shaft 17, the ring gear member 834 is continuously connected with the output shaft 19, and the planet carrier assembly member 846 is continuously connected with the housing 60. The sun gear members 822 and 832 are continuously interconnected by an interconnecting member 870 and the planet carrier assembly members 826 and 836 are continuously interconnected by an interconnecting member 872. The torque transmitting mechanism 850 selectively interconnects the sun gear member 842 with the interconnecting member 870. The torque transmitting mechanism 852 selectively interconnects the interconnecting member 870 with the planet carrier assembly member 846 and therefore the housing 60. The torque transmitting mechanism 854 selectively interconnects the interconnecting member 872 with the sun gear member 842. The torque transmitting mechanism 856 selectively interconnects the ring gear member 824 with the ring gear member 844 and therefore with the input shaft 17. The torque transmitting mechanism 858 selectively interconnects the housing with the interconnecting member 872.

The truth table shown in FIG. 18 defines the torque transmitting mechanism engagement required for each of the forward speed ratios and the reverse speed ratio. The truth table also indicates that the torque transmitting mechanism 858 can remain engaged during the neutral condition thereby simplifying the first/reverse interchange. The numerical values for the ratios have been determined using the ring/sun tooth ratios given in FIG. 18. The R1/S1 value is the ring/sun tooth ratio of the planetary gear set 820, the R2/S2 value is the ring/sun tooth ratio of the planetary gear set 830, and the R3/S3 value is the ring/sun tooth ratio of the planetary gear set 840. As can be determined from the truth table, the single ratio interchanges for the forward speed ratios are single transition interchanges. Also the double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 18 also describes the step ratio between adjacent ratios for example the numerical step between $1^{st}$ and $2^{nd}$ is 1.51.

Those skilled in the art will recognize that the numerical value of the reverse speed ratio is determined by the planetary gear sets 830 and 840. The numerical value of the first forward speed ratio is determined by the planetary gear sets 820 and 830. The numerical value of the second forward speed ratio is determined by the planetary gear sets 820 and 830. The numerical value of the third forward speed ratio is determined by the planetary gear sets 820, 830, and 840. The numerical value of the fourth forward speed ratio is determined by the planetary gear sets 820, 830, and 840. The numerical value of the fifth forward speed ratio is determined by the planetary gear set 840. The numerical value of the sixth forward speed ratio is determined by the planetary gear sets 830 and 840.

Figures 19, 20:
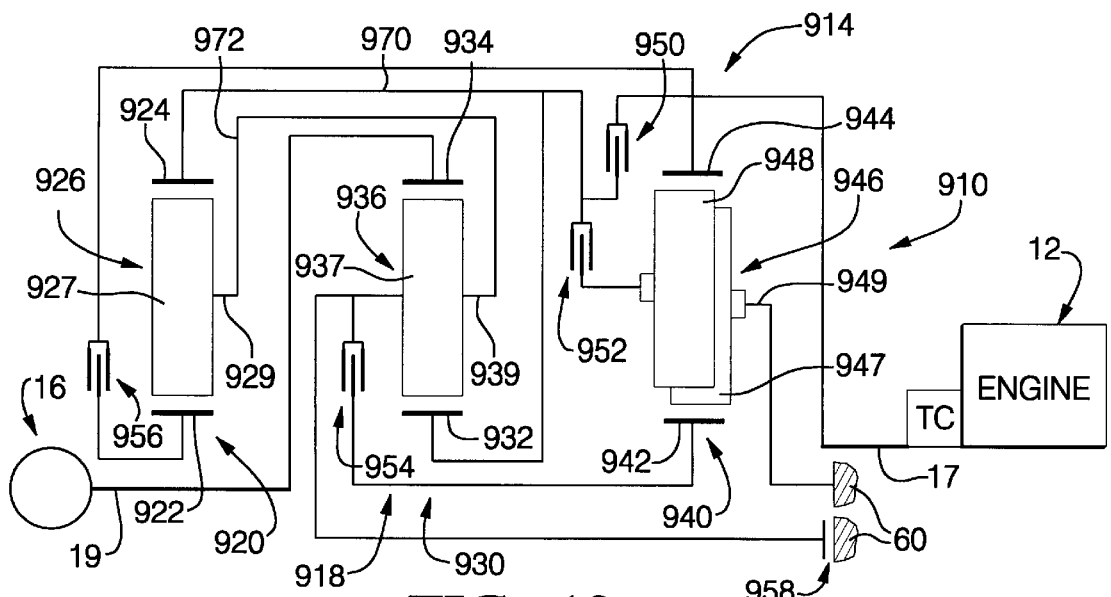
FIG. 19 is schematic representation of a powertrain incorporating another embodiment of the present invention.
FIG. 20 is a truth table and chart describing some of the operating characteristics of the powertrain depicted in FIG. 19.

A powertrain 910, shown in FIG. 19, has the conventional engine and torque converter 12, a planetary transmission 914, and the conventional final drive 16. The engine and torque converter 12 are drivingly connected with the transmission 914 through an input shaft 17. The transmission is drivingly connected with the final drive 16 through an output shaft 19. The planetary transmission 914 includes a planetary gear arrangement 918 that includes a first planetary gear set 920, a second planetary gear set 930 and a third planetary gear set 940. The planetary transmission also includes five torque transmitting mechanism 950, 952, 954, 956, and 958 which are conventional selectively engageable fluid operated devices. The torque transmitting mechanisms 950, 952, 954, and 956 are rotating type mechanisms which are commonly termed clutches. The torque transmitting mechanism 958 is a stationary type mechanism commonly termed brakes. The torque transmitting mechanisms 958 is connected to a stationary component of the transmission 914 such as the housing 60.

The planetary gear set 920 includes a sun gear member 922, a ring gear member 924, and a planet carrier assembly member 926 that has a plurality of planet pinion gear members 927 rotatably mounted on a planet carrier 929 and disposed in meshing relation with the sun gear member 922 and the ring gear member 924. The planetary gear set 930 includes a sun gear member 932, a ring gear member 934, and a planet carrier assembly member 936 that has a plurality of planet pinion gears 937 rotatably mounted on a planet carrier 939 and disposed in meshing relation with the sun gear member 932 and the ring gear member 934. The planetary gear set 940 has a sun gear member 942, a ring gear member 944, and a planet carrier assembly member 946 that includes a plurality of intermeshing planet pinion gears 947 and 948 rotatably mounted on a planet carrier 949 and disposed in meshing relation with the sun gear member 942 and the ring gear member 944, respectively.

The input shaft 17 is continuously connected with the ring gear member 944, the ring gear member 934 is continuously connected with the output shaft 19, and the planet carrier assembly member 946 is continuously connected with the housing 60. The ring gear member 924 and the sun gear member 932 are continuously interconnected by an interconnecting member 970. The planet carrier assembly member 926 and the planet carrier assembly member 936 are continuously interconnected by an interconnecting member 972. The torque transmitting mechanism 950 selectively interconnects the interconnecting member 970 with the ring gear member 944 and therefore the input shaft 17. The torque transmitting mechanism 952 selectively interconnects the interconnecting member 970 with the planet carrier assembly member 946 and therefore the housing 60. The torque transmitting mechanism 954 selectively interconnects the interconnecting member 972 with the sun gear member 942. The torque transmitting mechanism 956 selectively interconnects the sun gear member 922 with the ring gear member 944 and therefore the input shaft 17. The torque transmitting mechanism 958 selectively interconnects the interconnecting member 972 with the housing 60.

The truth table shown in FIG. 20 defines the torque transmitting mechanism engagement required for each of the forward speed ratios and the reverse speed ratio. The truth table also indicates that the torque transmitting mechanism 958 can remain engaged during the neutral condition thereby simplifying the first/reverse interchange. The numerical values for the ratios have been determined using the ring/sun tooth ratios given in FIG. 20. The R1/S1 value is the ring/sun tooth ratio of the planetary gear set 920, the R2/S2 value is the ring/sun tooth ratio of the planetary gear set 930, and the R3/S3 value is the ring/sun tooth ratio of the planetary gear set 940. As can be determined from the truth table, the single ratio interchanges for the forward speed ratios are single transition interchanges. Also the double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 20 also describes the step ratio between adjacent ratios for example the numerical step between $1^{st}$ and $2^{nd}$ is 1.55.

Those skilled in the art will recognize that the numerical value of the reverse speed ratio is determined by the planetary gear set 930. The numerical value of the first forward speed ratio is determined by the planetary gear sets 920 and 930. The numerical value of the second forward speed ratio is determined by the planetary gear sets 920 and 930. The third forward speed ratio is a one to one ratio. The numerical value of the fourth forward speed ratio is determined by the planetary gear sets 920, 930, and 940. The numerical value of the fifth forward speed ratio is determined by the planetary gear sets 930 and 940. The numerical value of the sixth forward speed ratio is determined by the planetary gear sets 930 and 940.

What is claimed is:

1. A transmission comprising:
   an input shaft;
   an output shaft
   a planetary gear arrangement comprising first, second, and third planetary gearsets, each planetary gearset including first, second and third members;
   five selectively operable torque transmitting mechanisms;
   first and second interconnecting members;
   said first interconnecting member continuously interconnecting said first member of said first planetary gearset with said first member of said second planetary gearset, said second interconnecting member continuously interconnecting said second member of said first planetary gearset with said second member of said second planetary gearset, said first member of said third planetary gearset being continuously connected with a stationary portion of said transmission;
   said input shaft being continuously connected with a member of one of said planetary gearsets that is not continuously interconnected with said stationary portion of said transmission;
   said output shaft being continuously connected with a member of said planetary gearsets that is not continuously interconnected with said input shaft or said stationary portion of said transmission; and
   said five torque transmitting mechanisms comprising at least four rotating torque-transmitting mechanisms which are engaged in combinations of two to establish at least six forward speed ratios and one reverse ratio in said planetary gearsets between said input shaft and said output shaft.

2. The transmission defined in claim 1 wherein:
   each of said planetary gearsets is a simple planetary gearset and one of said first second and third members of each planetary gearset is a planet carrier assembly comprising a carrier rotatably supporting a plurality of pinion gears meshing with each of the other members of said planetary gearsets.

3. The transmission defined in claim 1 wherein:
   at least one of said planetary gearsets is a compound planetary gearset having a sun gear member, a ring gear member, and a planet carrier assembly member having a carrier rotatably supporting a plurality of meshing pinion gears disposed in meshing relation with said sun gear member and said ring gear member respectively.

4. A multi-speed transmission comprising:
   an input shaft;
   an output shaft;
   first, second, and third planetary gearsets each comprised of first, second, and third members;
   first, second, third, fourth, and fifth selectively engageable torque transmitting mechanisms;
   said first member of said first planetary gearset being continuously connected with said first member of said second planetary gearset by a first interconnecting member, said second member of said first planetary gearset being continuously connected with said second member of said second planetary gearset by a second interconnecting member, said first member of said third planetary gearset being continuously connected with a stationary transmission housing, said input shaft being continuously connected with at least one member of said planetary gearsets, said output shaft being continuously connected with at least one member of one of said planetary gearsets that is not connected with said input shaft and said torque-transmitting mechanisms being engageable in combinations of two to establish six forward speed ratios and one reverse speed ratio between said input shaft and said output shaft wherein, said input shaft being continuously connected with said third member of said first planetary gearset, said output shaft being continuously connected with said first member of said first planetary gearset, said first torque-transmitting mechanism selectively interconnecting said second member of said third planetary gearset with said second interconnecting member, said second torque-transmitting mechanism selectively interconnecting said third member of said third planetary gearset with said second interconnecting member, said third torque-transmitting mechanism selectively interconnecting said third member of said third planetary gearset with said first interconnecting member, said fourth torque-transmitting mechanism selectively interconnecting said third member of said first planetary gearset with said second member of said third planetary gearset, and said fifth torque-transmitting mechanism selectively interconnecting said third member of said second planetary gearset with said second member of said third planetary gearset, or said input shaft being continuously connected with said first interconnecting member, said output shaft being continuously connected with said third member of said second planetary gearset, said first torque-transmitting mechanism selectively interconnecting said second member of said third planetary gearset with said first interconnecting member, said second torque-transmitting mechanism selectively interconnecting said second member of said third planetary gearset with said second interconnecting member, said third torque-transmitting mechanism selectively interconnecting said third member of said third planetary gearset with said third member of said first planetary gearset, said fourth torque-transmitting mechanism selectively interconnecting said third member of said third planetary gearset with said third member of said first planetary gearset, and said fifth torque-transmitting mechanism selectively interconnecting said third member of said third planetary gearset with said third member of said second planetary gearset, or said input shaft being continuously connected with said second interconnecting member, said output shaft being continuously connected with said first interconnecting member, said first torque-transmitting mechanism selectively interconnecting said second member of said third planetary gearset with said second interconnecting member, said second torque-transmitting mechanism selectively interconnecting said third member of said second planetary gearset with said first interconnecting member, said third torque-transmitting mechanism selectively interconnecting said second member of said third planetary gearset with said third member of said first planetary gearset, said fourth torque-transmitting mechanism selectively interconnecting said third member of said third planetary gearset with said third member of said first planetary gearset, and said fifth torque-transmitting mechanism selectively interconnecting said third member of said third planetary gearset with said third member of said second planetary gearset, or said input shaft being continuously connected with said third member of said first planetary gearset, said output shaft being continuously connected with said first interconnecting member, said first torque-transmitting mechanism selectively interconnecting said second member of said third planetary gearset with said second interconnecting member, said second torque-transmitting mechanism selectively interconnecting said third member of said third planetary gearset with said second interconnecting member, said third torque-transmitting mechanism selectively interconnecting said third member of said third planetary gearset with said first interconnecting member, said fourth torque-transmitting mechanism selectively interconnecting said second member of said third planetary gearset with said third member of said first planetary gearset, and said fifth torque-transmitting mechanism selectively interconnecting said second member of said third planetary gearset with said third member of said second planetary gearset, or said input shaft being continuously connected with said third member of said second planetary gearset, said output shaft being continuously connected with said first interconnecting member, said first torque-transmitting mechanism selectively interconnecting said second member of said third planetary gearset with said second interconnecting member, said second torque-transmitting mechanism selectively interconnecting said third member of said third planetary gearset with said second interconnecting member, said third torque-transmitting mechanism selectively interconnecting said third member of said first planetary gearset with said first interconnecting member, said fourth torque-transmitting mechanism selectively interconnecting said third member of said first planetary gearset with said second member of said third planetary gearset, and said fifth torque-transmitting mechanism selectively interconnecting said second member of said third planetary gearset with said third member of said second planetary gearset, or said input shaft being continuously connected with said second member of said third planetary gearset, said output shaft being continuously connected with said third member of said second planetary gearset, said first torque-transmitting mechanism selectively interconnecting said second member of said third planetary gearset with said first interconnecting member, said second torque-transmitting mechanism selectively interconnecting said third member of said third planetary gearset with said first interconnecting member, said third torque-transmitting mechanism selectively interconnecting said second member of said third planetary gearset with said second interconnecting member, said fourth torque-transmitting mechanism selectively interconnecting said third member of said third planetary gearset with said third member of said first planetary gearset, and said fifth torque-transmitting mechanism selectively interconnecting said stationary transmission housing with said second interconnecting member, or said input shaft being continuously connected with said second member of said third planetary gearset, said output shaft being continuously connected with said third member of said second planetary gearset, said first torque-transmitting mechanism selectively interconnecting said third member of said third planetary gearset with said first interconnecting member, said second torque-transmitting mechanism selectively interconnecting said first member of said third planetary gearset with said first interconnecting member, said third torque-transmitting mechanism selectively interconnecting said second member of said third planetary gearset with said second interconnecting member, said fourth torque-transmitting mechanism selectively interconnecting said third member of said third planetary gearset with said third member of said lust planetary gearset, and said fifth torque-transmitting mechanism selectively interconnecting said stationary transmission housing with said second interconnecting member, or said input shaft being continuously connected with said second member of said third planetary gearset, said output shaft being continuously connected with said third member of said second planetary gearset, said first torque-transmitting mechanism selectively interconnecting said third member of said third planetary gearset with said first interconnecting member, said second torque-transmitting mechanism selectively interconnecting said first member of said third planetary gearset with said first interconnecting member, said third torque-transmitting mechanism selectively interconnecting said second member of said third planetary gearset with said second interconnecting member, said fourth torque-transmitting mechanism selectively interconnecting said second member of said third planetary gearset with said third member of said first planetary gearset, and said fifth torque-transmitting mechanism selectively interconnecting said stationary transmission housing with said second interconnecting member, or said input shaft being continuously connected with said second member of said third planetary gearset, said output shaft being continuously connected with said third member of said second planetary gearset, said first torque-transmitting mechanism selectively interconnecting said third member of said third planetary gearset with said first interconnecting member, said second torque-transmitting mechanism selectively interconnecting said third member of said third planetary gearset with said second interconnecting member, said fourth torque-transmitting mechanism selectively interconnecting said second member of said third planetary gearset with said third member of said first planetary gearset, and said fifth torque-transmitting mechanism selectively interconnecting said stationary transmission housing with said second interconnecting member, or said input shaft being continuously connected with said second member of said third planetary gearset, said output shaft being continuously connected with said third member of said second planetary gearset, said first torque-transmitting mechanism selectively interconnecting said second member of said third planetary gearset with said first interconnecting member, said second torque-transmitting mechanism selectively interconnecting said first member of said third planetary gearset with said first interconnecting member, said third torque-transmitting mechanism selectively interconnecting said third member of said third planetary gearset with said second interconnecting member, said fourth torque-transmitting mechanism selectively interconnecting said second member of said third planetary gearset with said third member of said first planetary gearset, and said fifth torque-transmitting mechanism selectively interconnecting said stationary transmission housing with said second interconnecting member; and said five torque transmitting mechanisms being engaged in combinations of two to establish six forward speed ratios and one reverse speed ratio between said input and output shafts.

5. The transmission defined in claim 4 wherein:

said members of each of said planetary gearsets are a sun gear member, a ring gear member, and a planet carrier assembly member; and said planet carrier assembly member including a carrier rotatably supporting a plurality of pinion gears disposed in meshing relation with both the sun gear member and the ring gear member.

6. The multi-speed transmission defined in claim 4 further wherein:

said members of each of said planetary gearsets are a sun gear member, a ring gear member, and a planet carrier assembly member; and at least one of said planet carrier assembly members including a carrier rotatably supporting a plurality of intermeshing pinion gears with one of said pinion gears meshing with said sun gear member and the other of said pinion gears meshing with said ring gear member.

7. The multi-speed transmission defined in claim 6 further wherein:

a remainder of said planet carrier assembly members includes a carrier rotatably supporting a plurality of pinion gears each meshing with both the sun gear member and the ring gear member.

8. A multi-speed transmission comprising:

an input shaft;

an output shaft;

first, second, and third planetary gearsets each comprised of first, second, and third members;

five selectively engageable torque transmitting mechanisms;

said first member of said first planetary gearset being continuously connected with said first member of said second planetary gearset, said second member of said first planetary gearset being continuously connected with said second member of said second planetary gearset, said first member of said third planetary gearset being continuously connected with a stationary transmission housing, said input shaft and said output shaft being continuously connected with at least one member of one of said planetary gearsets, a first torque transmitting mechanism selectively connecting said third member of said third planetary gearset with said second interconnecting member;

a second torque transmitting mechanism selectively connecting said second member of said third planetary gearset with said second interconnecting member;

a third torque transmitting mechanism selectively connecting said second member of said third planetary gearset with said first interconnecting member;

a fourth torque transmitting mechanism selectively connecting said third member of said third planetary gearset with said third member of said first planetary gearset;

a fifth torque transmitting mechanism selectively connecting said third member of said third planetary gearset with said third member of said second planetary gearset; and said five torque transmitting mechanisms being engaged in combinations of two to establish six forward speed ratios and one reverse speed ratio between said input and output shafts.

* * * * *